(12) United States Patent
Sugawara et al.

(10) Patent No.: US 6,252,672 B1
(45) Date of Patent: *Jun. 26, 2001

(54) IMAGE COMMUNICATION APPARATUS

(75) Inventors: Naoki Sugawara; Ichiro Iwasaki, both of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,499

(22) Filed: Oct. 17, 1997

(30) Foreign Application Priority Data

Oct. 18, 1996 (JP) ...................................................... 8-297402
Oct. 18, 1996 (JP) ...................................................... 8-297403

(51) Int. Cl.[7] .............................. G06F 15/00; H04N 1/36; H04N 1/32
(52) U.S. Cl. ........................... 358/1.15; 358/442; 358/412
(58) Field of Search ..................................... 358/434, 435, 358/436, 439, 468, 504, 406, 501, 405, 1.9, 1.15, 1.5, 296, 442, 412; 379/100.1

(56) References Cited

U.S. PATENT DOCUMENTS

| | | | | |
|---|---|---|---|---|
| 5,508,820 | * | 4/1996 | Kabeya | 358/404 |
| 5,563,712 | * | 10/1996 | Nohata | 358/296 |
| 5,710,582 | * | 1/1998 | Hawkins et al. | 347/42 |
| 5,751,449 | * | 5/1998 | Nobuta | 358/501 |
| 5,768,659 | * | 6/1998 | Kameda | 399/111 |
| 6,048,045 | * | 4/2000 | Nohata et al. | 347/7 |
| 6,099,102 | * | 8/2000 | Tanaka et al. | 347/9 |

* cited by examiner

Primary Examiner—Madeleine Nguyen
(74) Attorney, Agent, or Firm—Fitzpatrick, Cella, Harper & Scinto

(57) ABSTRACT

A communication apparatus includes a receiver which receives data from a partner, and an informing device which informs the partner of a maximum reception speed of the apparatus. Also included are a recorder which records on a recording sheet, image data received by the receiver, and a detector which detects a maximum recording ability of the recorder. Lastly included is a controller which causes the informing device to vary the maximum reception speed to be informed to the partner, according to the maximum recording ability detected by the detector.

6 Claims, 24 Drawing Sheets

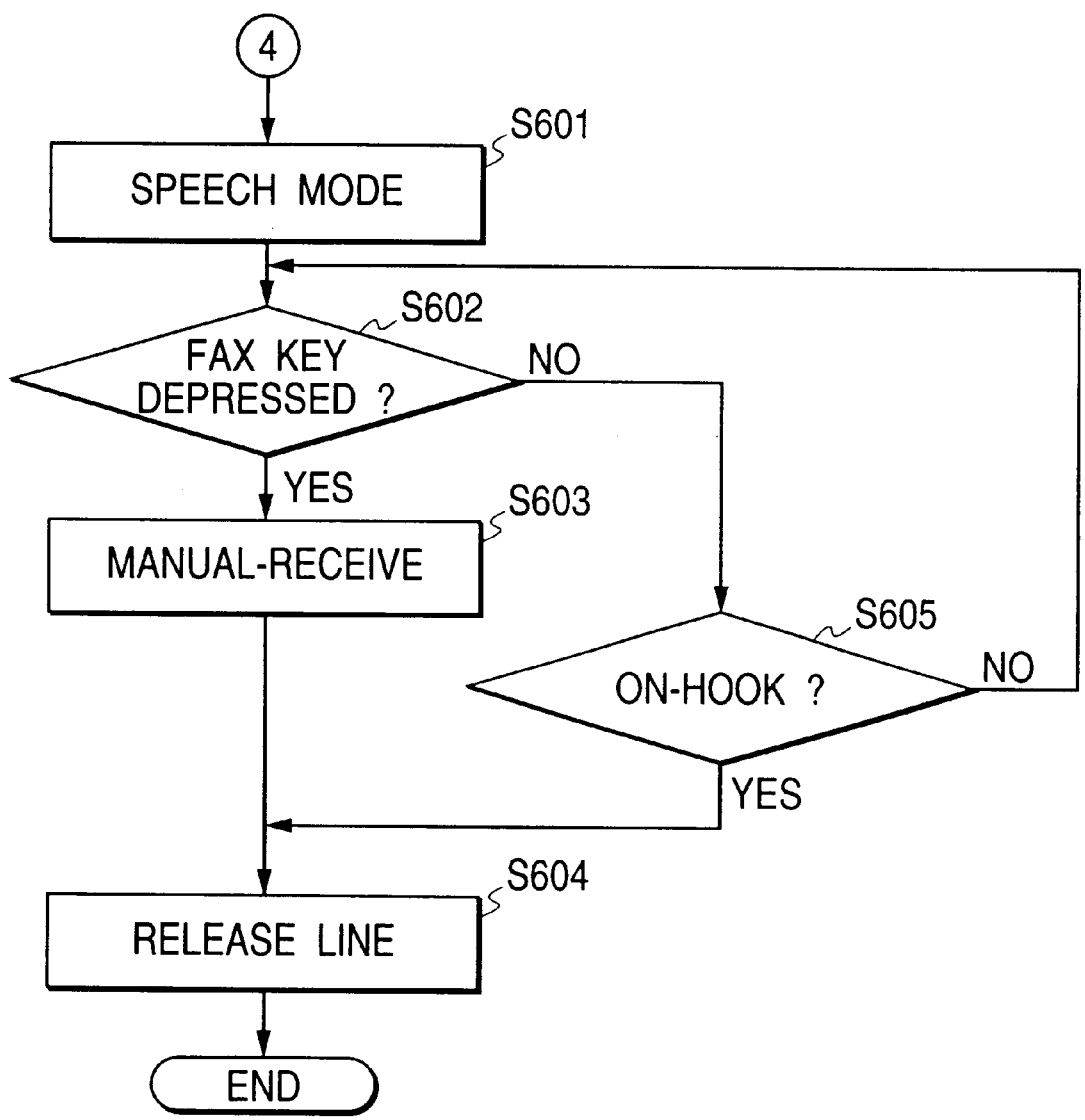

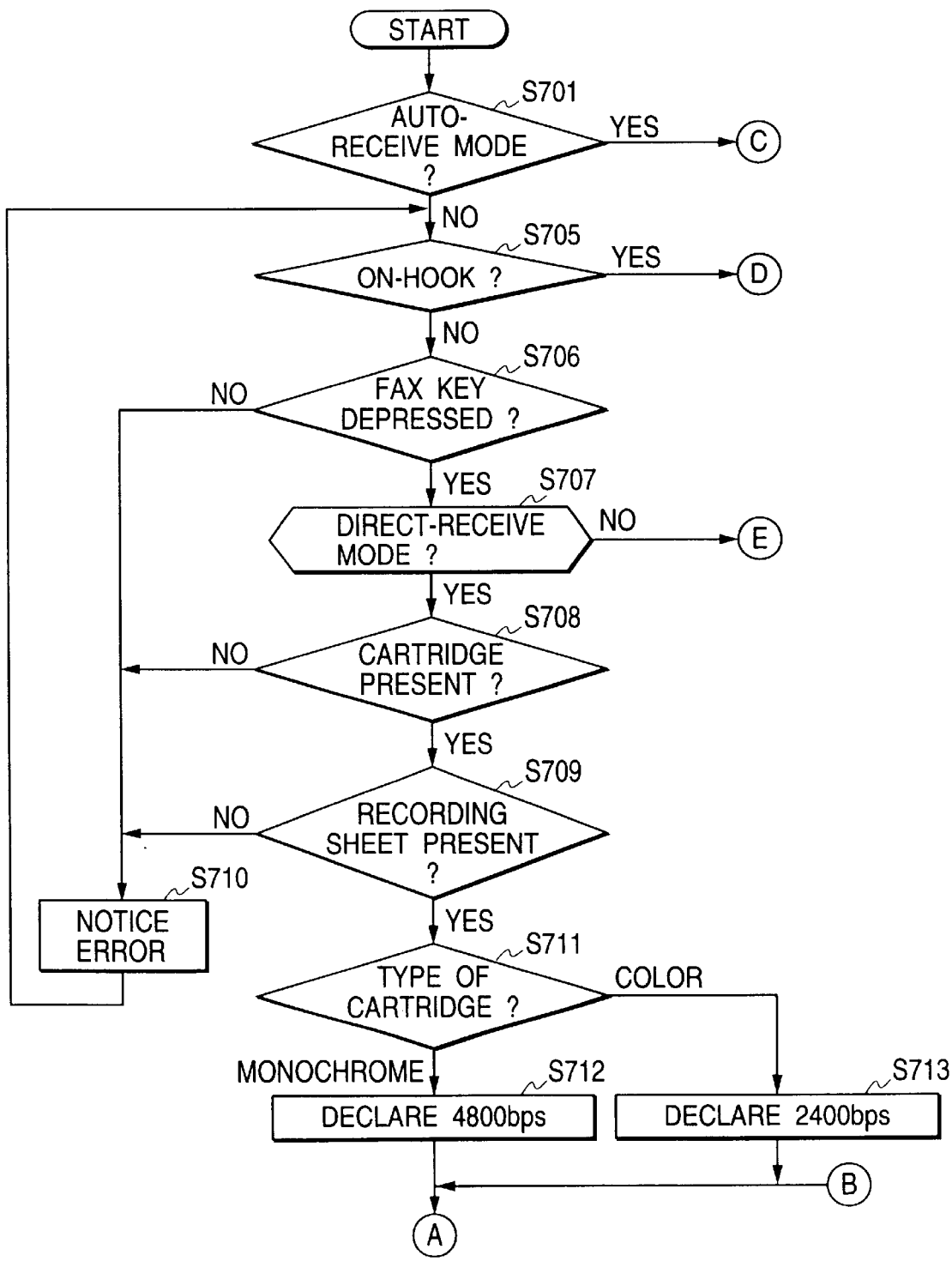

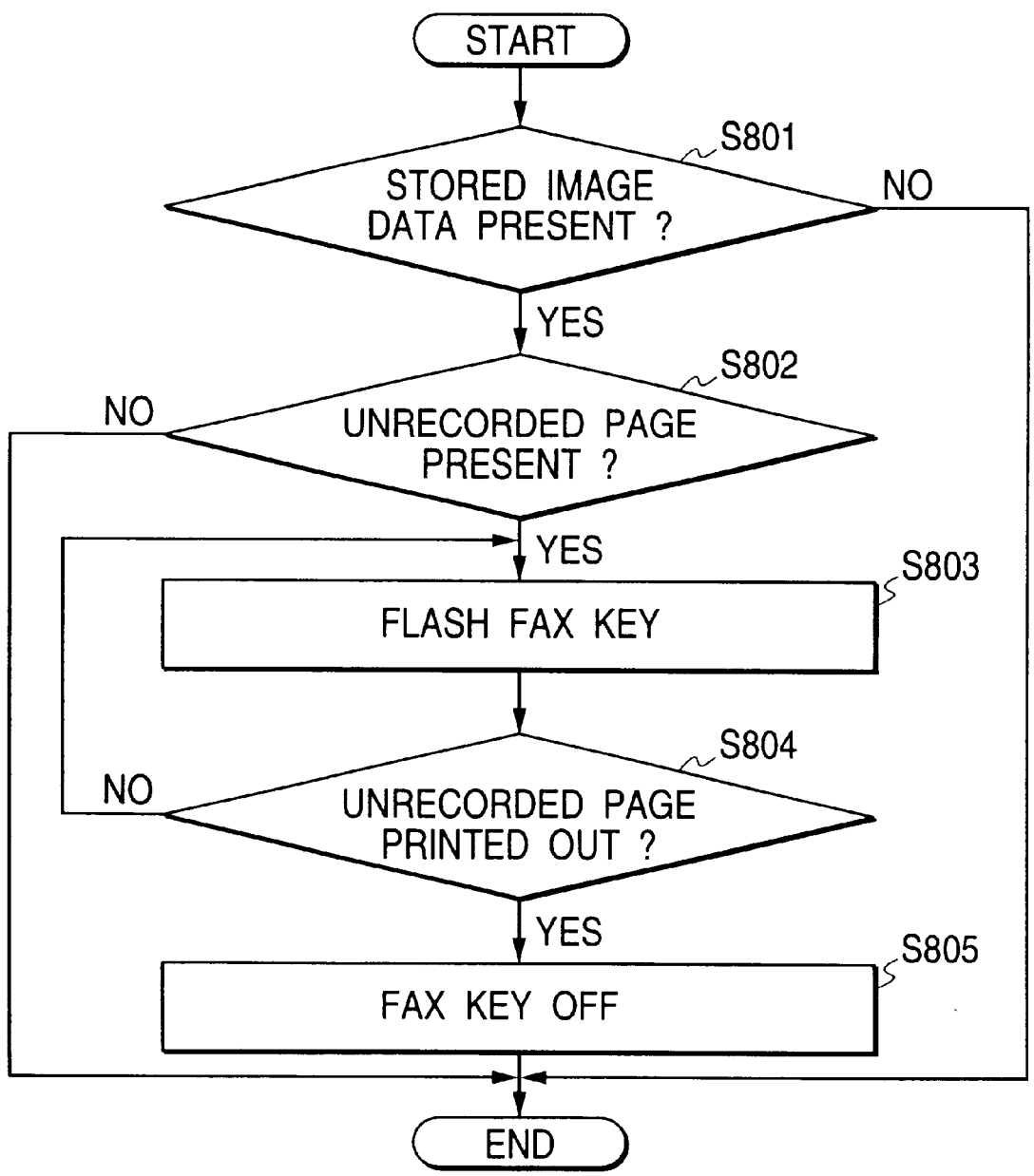

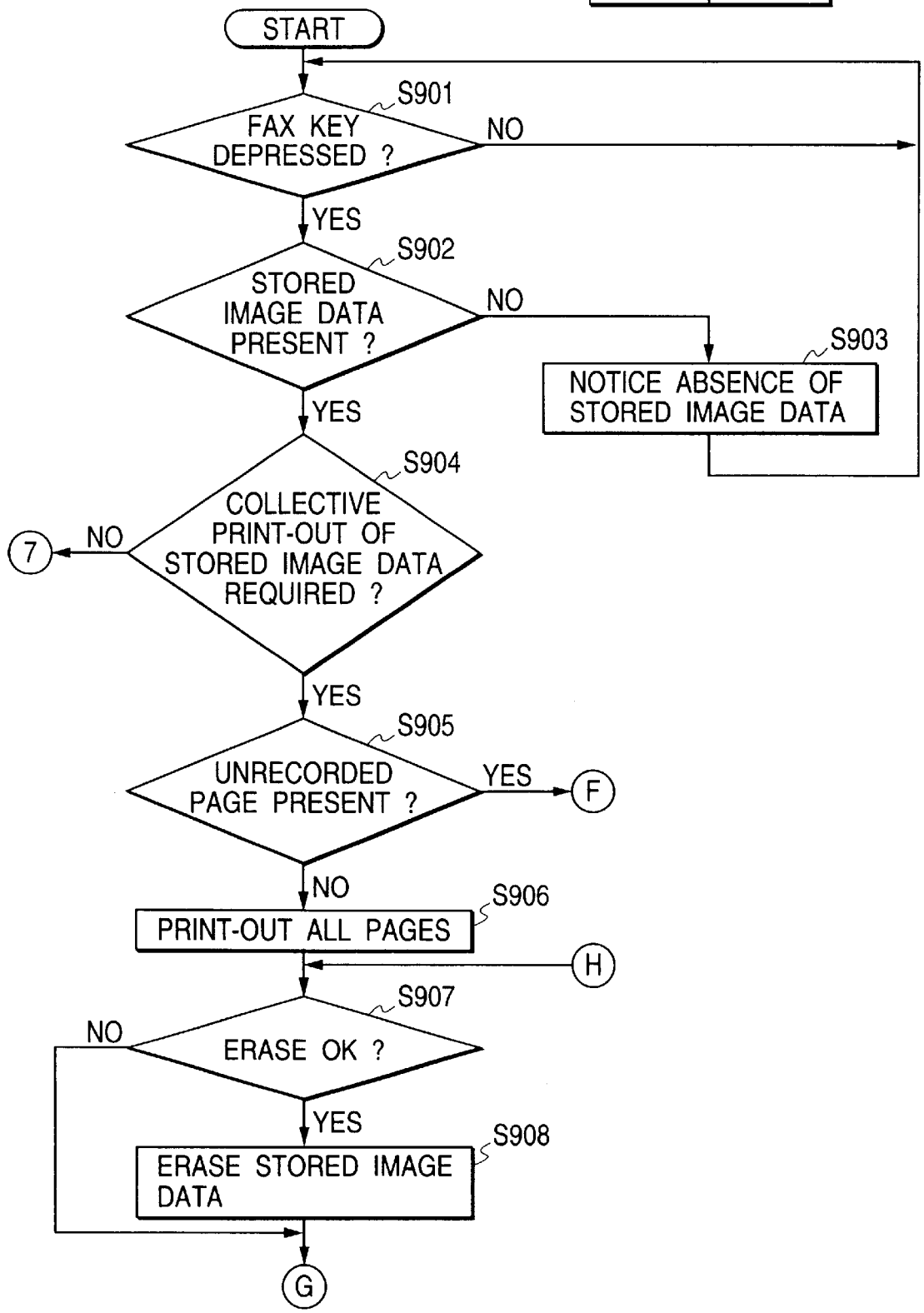

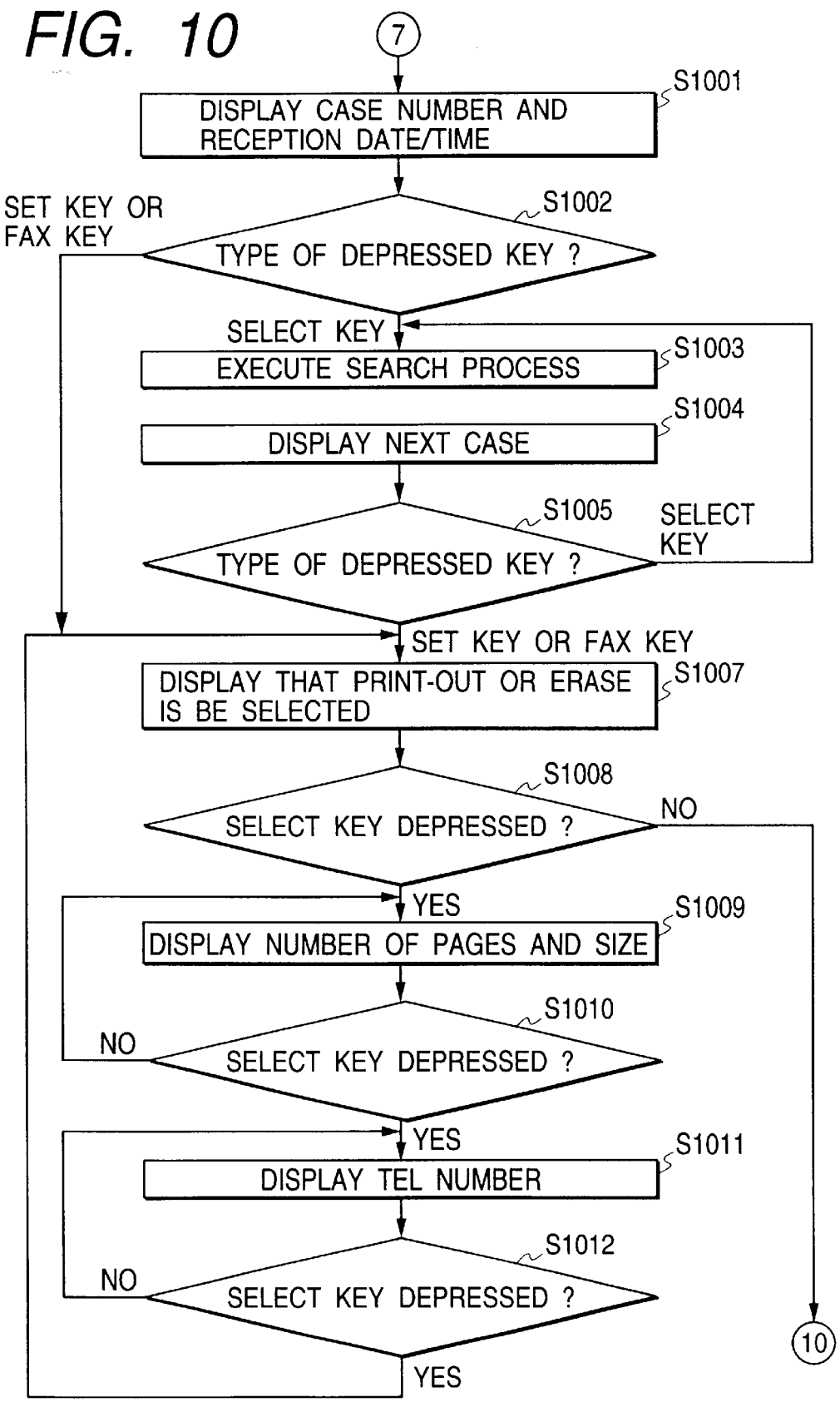

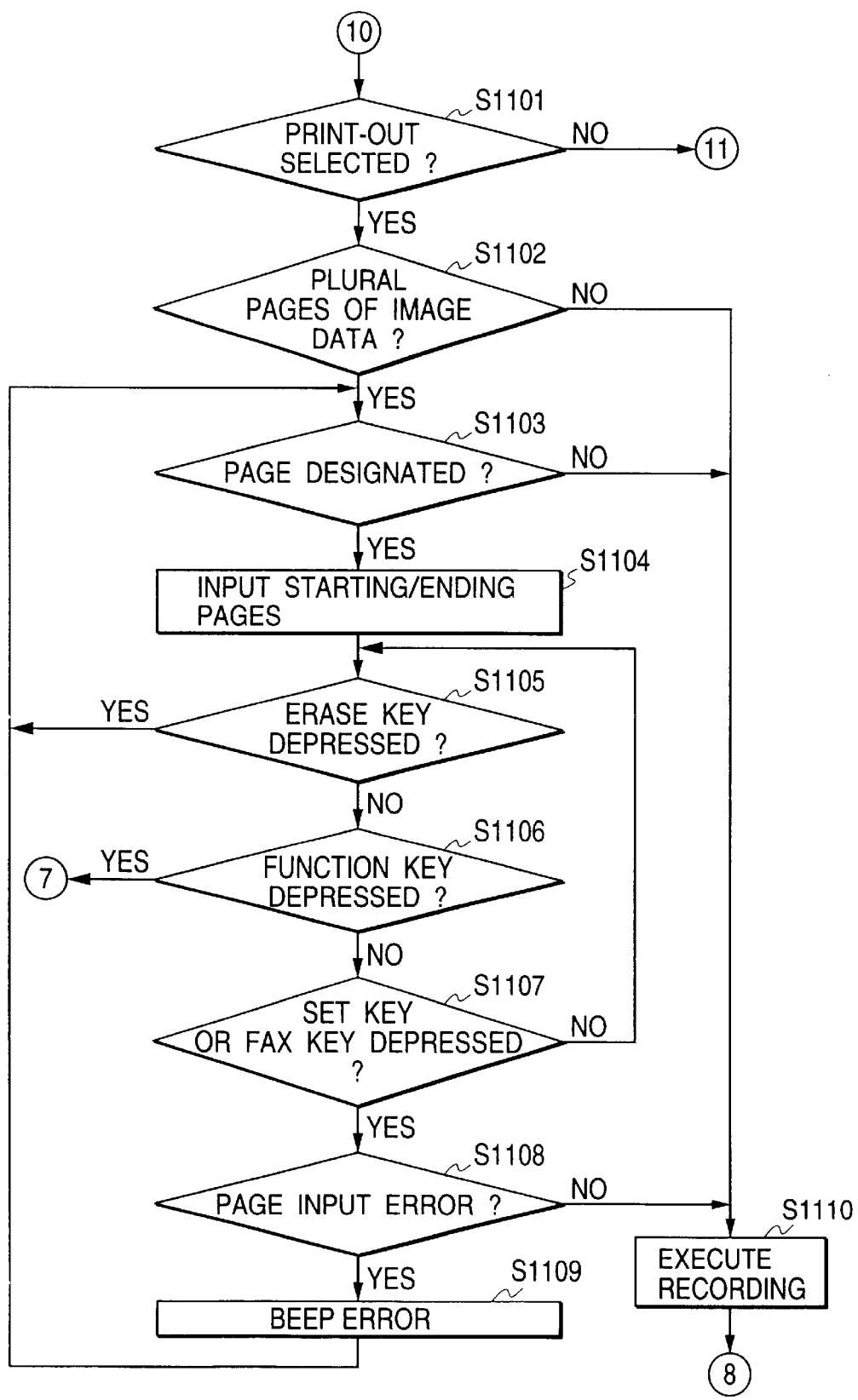

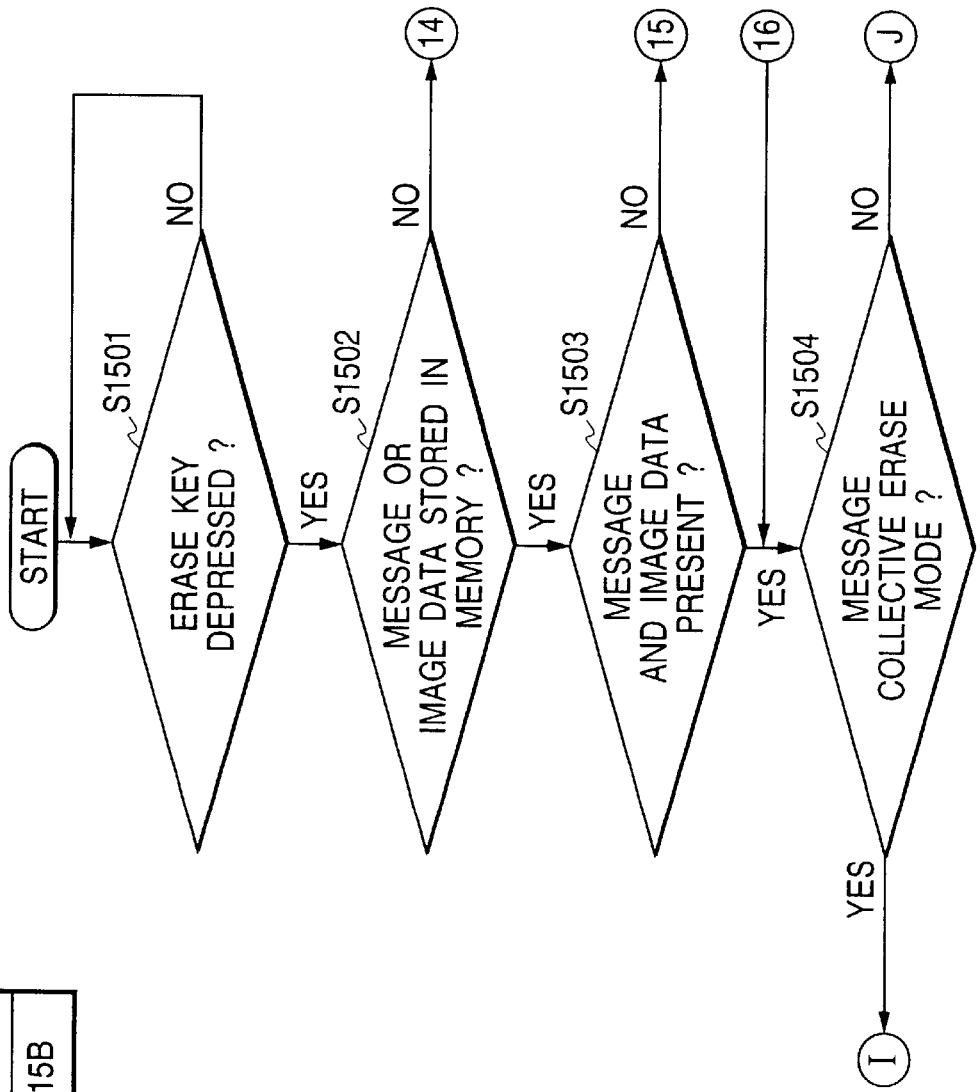

IMAGE COMMUNICATION APPARATUS

BACKGROUND OF THE INVENTION

1. Field of the Invention

The present invention relates to an image communication method and apparatus capable of recording an image in color and monochrome, and a memory medium to be used in the image communication method and apparatus.

2. Related Background Art

A conventional facsimile apparatus can be loaded, on an image recording means, with only one of a color ink (or toner) cartridge and a monochromatic ink (or toner) cartridge, and it has not been possible to interchange one of the color ink (or toner) cartridge and the monochromatic ink (or toner) cartridge with the other.

Also a communication rate has been informed to a destination of the image communication, regardless of the kind of the ink (or toner) cartridge.

However, in case of contemplating a facsimile apparatus with an interchangeable ink (or toner) cartridge, a recording speed varies according to the kind of the cartridge since the characteristics of the cartridge (such as the discharge amount of ink or toner) are different between the color ink (or toner) cartridge and the monochromatic ink (or toner) cartridge.

Consequently, in case of image reception and recording in parallel in such facsimile apparatus with an interchangeable ink cartridge, a time for reception processing has to be made longer in case the color ink cartridge is loaded on the recording means, in comparison with the case of the monochromatic ink cartridge, since the color ink cartridge has a smaller number of ink discharging nozzles than in the monochromatic ink cartridge. (It is noted that when the color ink cartridge is loaded, the image received by facsimile transmission is recorded monochromatically with the monochromatic nozzles.)

On the other hand, in case the received image is stored in a memory instead of the parallel reception/recording a communication time can be made shorter by means of informing a higher communication rate to the destination because the discharge of ink (or toner) is irrelevant.

SUMMARY OF THE INVENTION

An object of the present invention is to provide a communication apparatus capable of switching a communication process according to the characteristics of a printer.

Another object of the present invention is to provide a communication apparatus capable of switching the communication process according to the kind of the cartridge mounted on the printer.

Still another object of the present invention is to provide an image communication method and apparatus in which a memory reception process may be conducted in case of an auto reception mode, and in case of a direct reception mode, an image reception process may be effected with a communication rate to be informed to a partner station being variable according to the kind of a recording means (for example a color or monochromatic ink cartridge).

Still another object of the present invention is to provide an image communication method and apparatus in which a memory reception process may be conducted in case an image recording sheet is absent, and, in case the image recording sheet is present, an image reception process with a communication rate to be informed to the partner station being variable according to the presence or absence or the kind of the recording means (for example, a color or monochromatic ink cartridge).

Still another object of the present invention is to provide a memory medium storing a program for controlling the above-mentioned image communication method and apparatus.

BRIEF DESCRIPTION OF THE DRAWINGS

FIGS. 3, 4, 5 and 6 are flow charts showing operations of the image communication apparatus in case of reception of a call from a partner station;

FIGS. 7A and 7B, combined as shown in FIG. 7, are flow charts showing an operation for direction reception of a facsimile image in the above-mentioned image communication apparatus;

FIG. 8 is a flow chart showing an operation for recording and erasing the facsimile image received by memory reception in the above-mentioned image communication apparatus;

FIGS. 9A and 9B, combined as shown in FIG. 9, are flow charts showing operations for recording and erasing the facsimile image received by memory reception in the above-mentioned image communication apparatus;

FIG. 10 is a flow chart showing an operation for direction reception of the facsimile image in the above-mentioned image communication apparatus;

FIGS. 11 and 12 are flow charts showing operations for recording and erasing the facsimile image received by the memory reception in the above-mentioned image communication apparatus;

FIGS. 15A and 15B, combined as shown in FIG. 15, are flow charts showing an operation for collectively erasing the facsimile images and the messages stored in the message phone in the above-mentioned image communication apparatus;

DESCRIPTION OF THE PREFERRED EMBODIMENTS

Preferred embodiments of the present invention will be described in detail with reference to the attached drawings.

First embodiment

Figure 1:
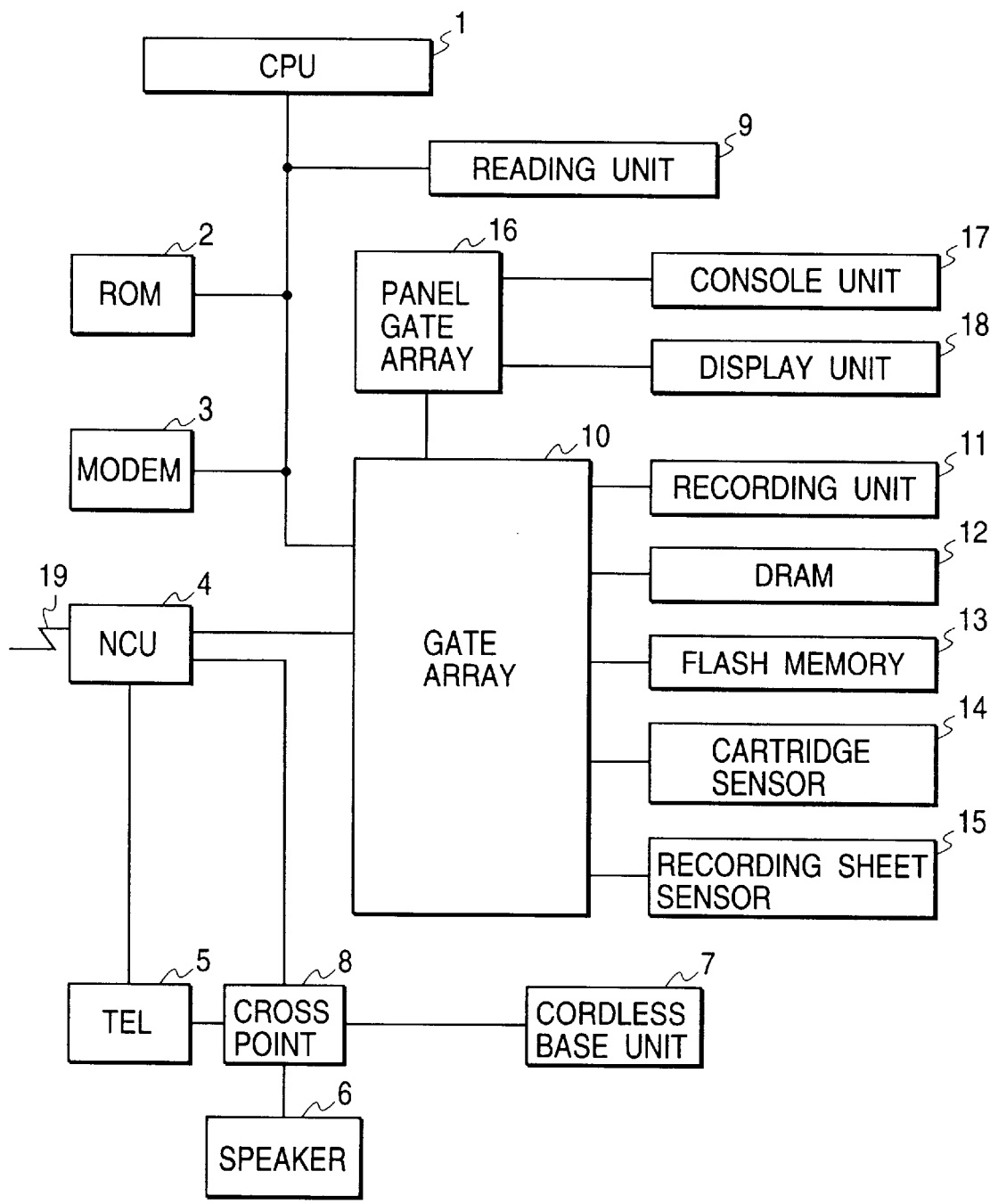
FIG. 1 is a block diagram showing the configuration of an image communication apparatus according to a first embodiment of the present invention.

At first there will be explained a first embodiment of the present invention, with reference to FIGS. 1 to 6, 7A and 7B, 8, 9A and 9B, 10 to 14, 15A and 15B, 16 to 20. FIG. 1 is a block diagram showing the configuration of a facsimile apparatus with a message telephone function, constituting an image communication apparatus of the first embodiment of the present invention. In this drawing, there are shown a CPU (central processing unit) 1 for controlling the entire apparatus according to a control program stored in a ROM (read-only memory) to be explained later, utilizing a RAM (random access memory) (not shown) as a work area; and a ROM (read-only memory) for storing the control program for controlling the present apparatus; a MODEM 3 for modulating a digital signal from the CPU 1 into an analog signal for transmission to a telephone line 19 and demodulating an analog signal received from the telephone line 19 into a digital signal for transfer to the CPU 1.

There are also provided a network control unit (NCU) 4 for connection control such as issuance or reception of a call to or from the network and for reconnection or disconnection of the line; a message telephone unit (TEL) 5; a speaker 6; a base unit (cordless base unit) 7 for a cordless telephone unit (subsidiary phone, not shown) provided as an accessory to the present apparatus, the base unit being provided in a single unit or in plural units; a cross point 8 constituting switching means for selectively connecting the telephone unit 5, the speaker 6 and the cordless base unit 7 to the telephone line 19; a reading unit 9 for scanning an original in case of transmission or copying thereof; a gate array 10 to which are connected the CPU 1, the NCU 4, the recording unit 11, a DRAM 12, a flash memory 13, a cartridge sensor 14, a recording sheet sensor 15 and a panel gate array 16.

A recording unit 11 serves to record an image to be copied image or an image received from a partner apparatus in the facsimile communication, by an ink jet recording method, a laser recording method, a thermal recording method, etc. In a case of the ink jet recording or the laser recording, an ink (or toner) cartridge is interchangeable between a color cartridge and a monochromatic cartridge. In the present embodiment, the image received in the facsimile communication is monochromatically recorded even when the color ink (or toner) cartridge is utilized, while the image to be copied is recorded in color.

In the following description, it is assumed that the present embodiment employs the ink jet recording method.

Figure 19:
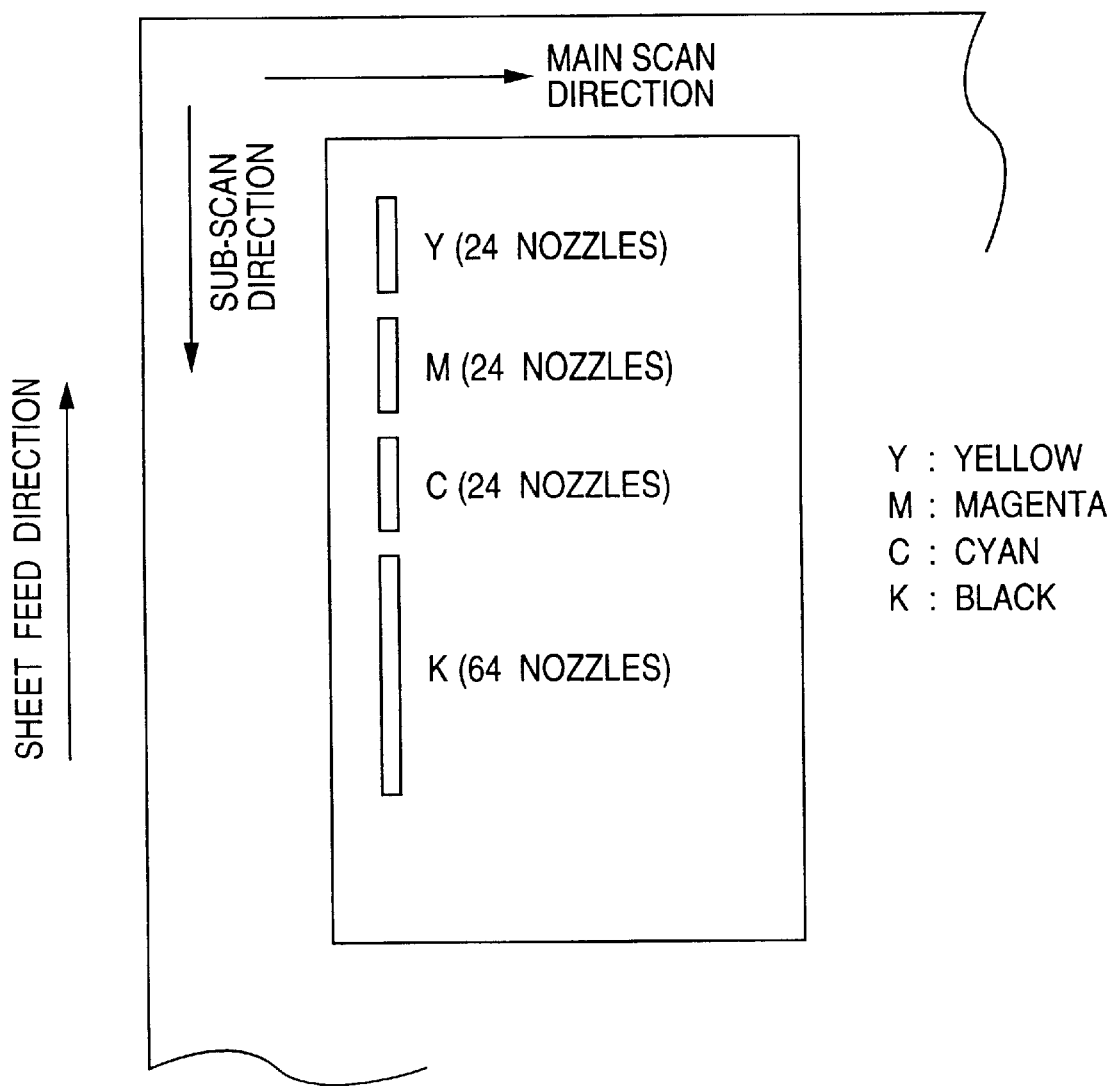
FIG. 19 is a view showing a color ink jet head of the above-mentioned image communication apparatus.
Figure 20:
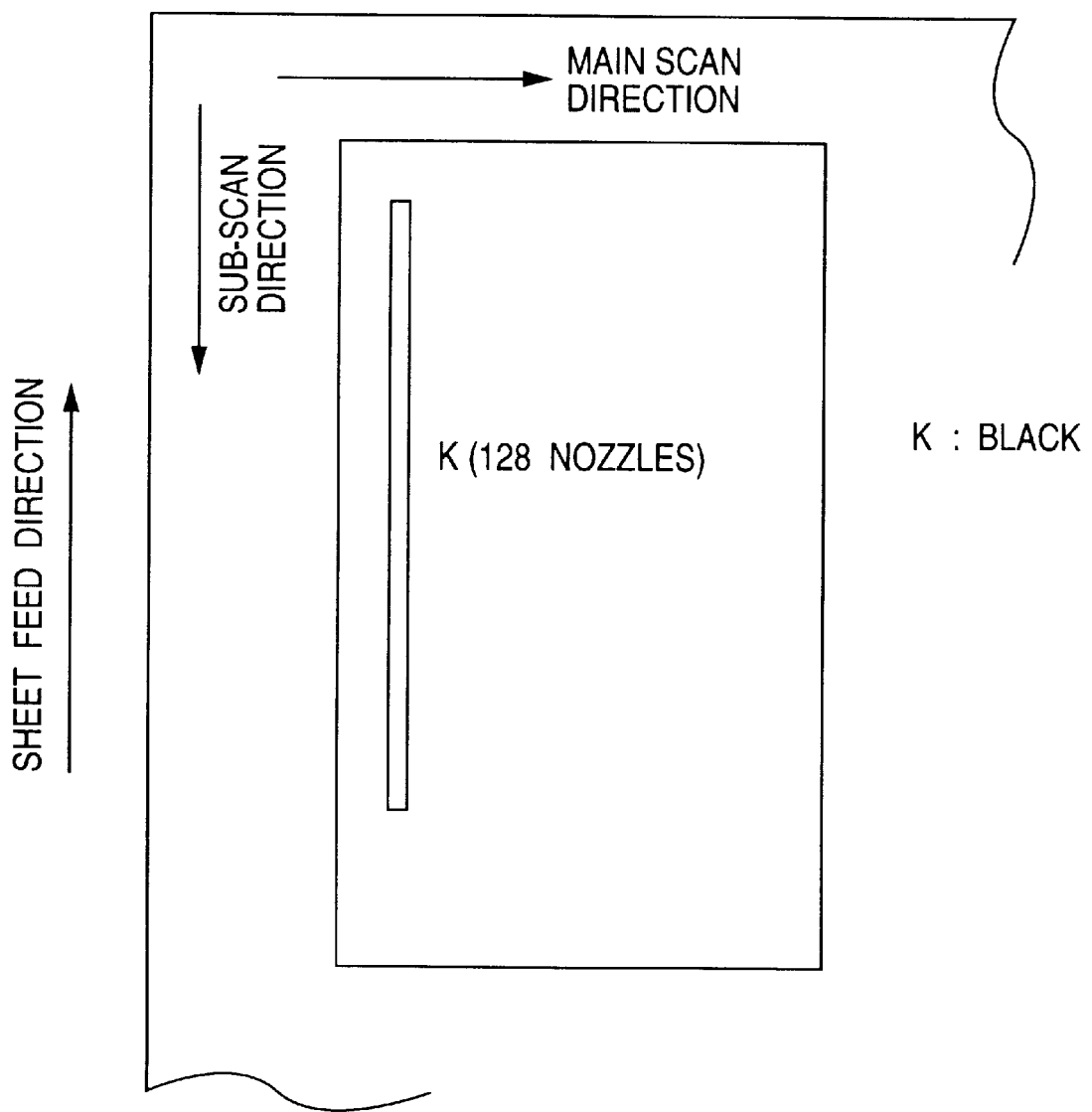
FIG. 20 is a view showing a monochromatic ink jet head of the above-mentioned image communication apparatus.

The recording unit 11 is provided with a support member (not shown) for supporting the cartridge. The recording unit 11 utilizes an ink jet recording head, in which plural nozzles are aligned along sub scanning direction to form a recording face of the recording head. The arrangements of the recording nozzles of different colors of this type of recording head in a transporting direction of a recording sheet and main and sub scanning directions are shown in FIGS. 19 and 20, respectively. Referring to FIG. 19, the recording head is provided with 64 nozzles for recording the black color (K), aligned in the sub scanning direction. In case of color recording, only 24 nozzles are used among the 64 nozzles, while, in case of monochromatic recording, all the 64 K nozzles are used. In parallel with the K nozzles, there are provided 24 nozzles respectively for cyan (C) color, magenta (M) color and yellow (Y) color, in the order of C, M and Y. In case of color image recording, the recording operation is initiated after all the image data are accumulated for 24 nozzles for each of C, M, Y and K colors. A carriage supporting the recording head is reciprocated in the main scanning direction, perpendicular to the direction of the array of the nozzles, to form an image in an area corresponding to the recording width of the plural nozzles. Thereafter, the recording sheet is transported in the sub scanning direction by the recording width, and the image is formed on the recording sheet by repeating the recording operation in the above-explained manner. The recording head employed in the present embodiment is an ink cartridge incorporating therein ink tanks. A monochromatic ink jet cartridge shown in FIG. 20 is provided with 128 nozzles for recording the black (K) color.

The DRAM 12 serves to temporarily store a predetermined amount of image data, in case of recording a received image or a copy image. The flash memory 13 is used for storing the received image in case of an auto-reception mode or in case the image recording sheet is absent and an user supplements recording sheets, and also for storing the message from a partner in a message telephone mode, and is therefore used in common by the facsimile apparatus and by the message telephone unit 5. The cartridge sensor 14 detects the presence or absence of the ink (or toner) cartridge on the recording unit 11 or the kind (color or monochromatic) of the cartridge. The recording sheet sensor 15 detects the presence or absence of the recording sheet for image recording. The panel gate array 16 serves to connect the operation unit 17 and the display unit 18 with the gate array 10. The operation unit 17 is provided with various keys to be used by the user for operating the present apparatus. The display unit 18 is used for displaying various information for the user. There is also shown a telephone line 19.

Figure 2:
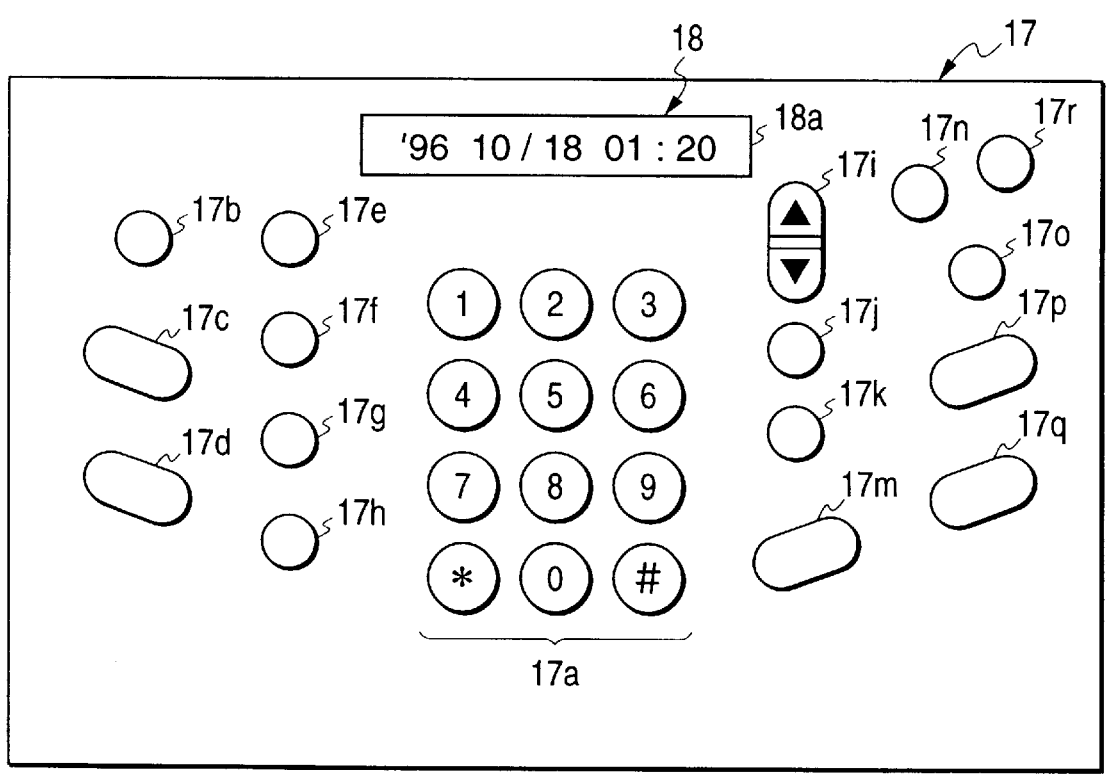
FIG. 2 is a plan view of an operation/display unit of the above mentioned image communication apparatus.

FIG. 2 shows the details of the operation unit 17 and the display unit 18. The display unit 18 is provided with a display unit 18a, composed of for example, a liquid crystal display (LCD) unit, for displaying the date, error warnings, operation procedure, function status, etc. The display unit 18a may also be composed, for example of LED's (light emitting diodes) instead of the LCD.

Referring to FIG. 2, the operation unit 17 is provided with numeral keys 17a, a response message key 17b, a monochromatic copy key 17c, a color copy key 17d, a transfer/call key 17e, a redial/pause key 17f, a catch-phone/short-cut dial key 17g, an on-hook key 17h, a volume adjustment and selection key (volume/selection key) 17i, an erasure key 17j, a hold/message reproduction key 17k, a message record/reproduction key 17m, a function key 17n, a mode selection key 17o, a stop key 17p, a FAX key 17q and a set key 17r.

The numeral keys 17a are used for entering a number such as a telephone number or a number of copies to be made. The response message key 17b is used for recording the voice of the partner during speech communication, reproducing thus recorded voice, recording a replay message to another user in case of the user is absent, or reproducing the recorded message. The monochromatic copy key 17c is used in case of recording the image in monochromatic manner. The color copy key 17d is used in case of recording the image in color. The transfer/call key 17e is used for calling, from the present apparatus or from the cordless subsidiary telephone unit, another subsidiary telephone unit or transferring a channel during speech communication. The redial/pause key 17f is used for calling again a partner called most recently, or forming a predetermined pause (for example30 seconds) in the course of dialing.

The catch-phone/short-cut dial key 17g is used for utilizing the "catch-phone" service provided by NTT, enabling to accept an incoming call in the course of another call, or for short-cut dialing. The on-hook key 17h is depressed for effecting on-hook. The volume/selection key 17i is used for selecting a setting item or adjusting the loudness of a call tone of the message telephone unit 5 or a volume of a voice of a telephone handset. In order to use the volume/selection key 17i for function selection, the function key 17n is at first depressed, whereby the display unit 18 displays, for example, the "reception mode". The volume/selection key 17i is then depressed to alter the display in the display unit 18 in succession. For example, in order to set the telephone number of the user, the volume/selection key 17i is repeatedly depressed until a message "Your telephone number" is displayed. On the other hand, in order to use the volume/selection key 17i for volume adjustment, the function key 17n is not depressed. The loudness of the call tone of the message telephone unit 5 varies if the volume/selection key 17i is depressed during telephone communication, but the volume of the voice from the headset of the message telephone unit 5 varies if the volume/selection key 17i is depressed during the telephone communication.

The erasure key 17j is used for shifting to a process for erasing the facsimile reception image recorded in the flash memory 13 and the messages recorded in the message telephone unit 5. The hold/message reproduction key 17k is used for temporarily holding the line in communication or reproducing all the messages recorded in the message telephone unit 5. The message record/reproduction key 17m is used for setting the present apparatus in the message telephone mode or resetting such mode, and for reproducing only the unreproduced message in case resetting the message telephone mode. The function key 17n is used for selecting various functions, in case of using the hold/message reproduction key 17k or the message record/reproduction key 17m in order to reproduce the message recorded by the message telephone unit 5. The mode selection key 17o is used for selecting a standard mode or a fine mode in case of reading an original in the facsimile transmission or in the copying. The stop key 17p is used for stopping various operations when necessitated. The FAX key 17q is used in case of facsimile transmission or manual facsimile reception. The set key 17r is used, for example, when the data input on the operation unit 17 is completed.

In the following there will be explained, with reference to flow charts shown in FIGS. 3 to 18, an operation of the above-explained image communication apparatus of the present embodiment.

At first there will be explained, with reference to FIGS. 3 to 6, an operation of the image communication apparatus when a call is received from a partner.

At first the NCU 4 detects a CI signal (calling signal) (step S301 in FIG. 3), and, when the handset of the present apparatus or the subsidiary telephone unit is off-hook (step S302), a speech mode is set (step S601 in FIG. 6). If the FAX key 17q is depressed during the speech communication, the mode is shifted to a manual reception mode (step S603). When the reception is completed, the NCU 4 disconnects the line (step S604) whereby a speech mode process is terminated. If the handset is on-hook (step S605) without the depression of the FAX key 17q (step S602) in the course of the speech communication, the NCU 4 disconnects the line (step S604) whereby the speech mode process is terminated.

Figure 3:
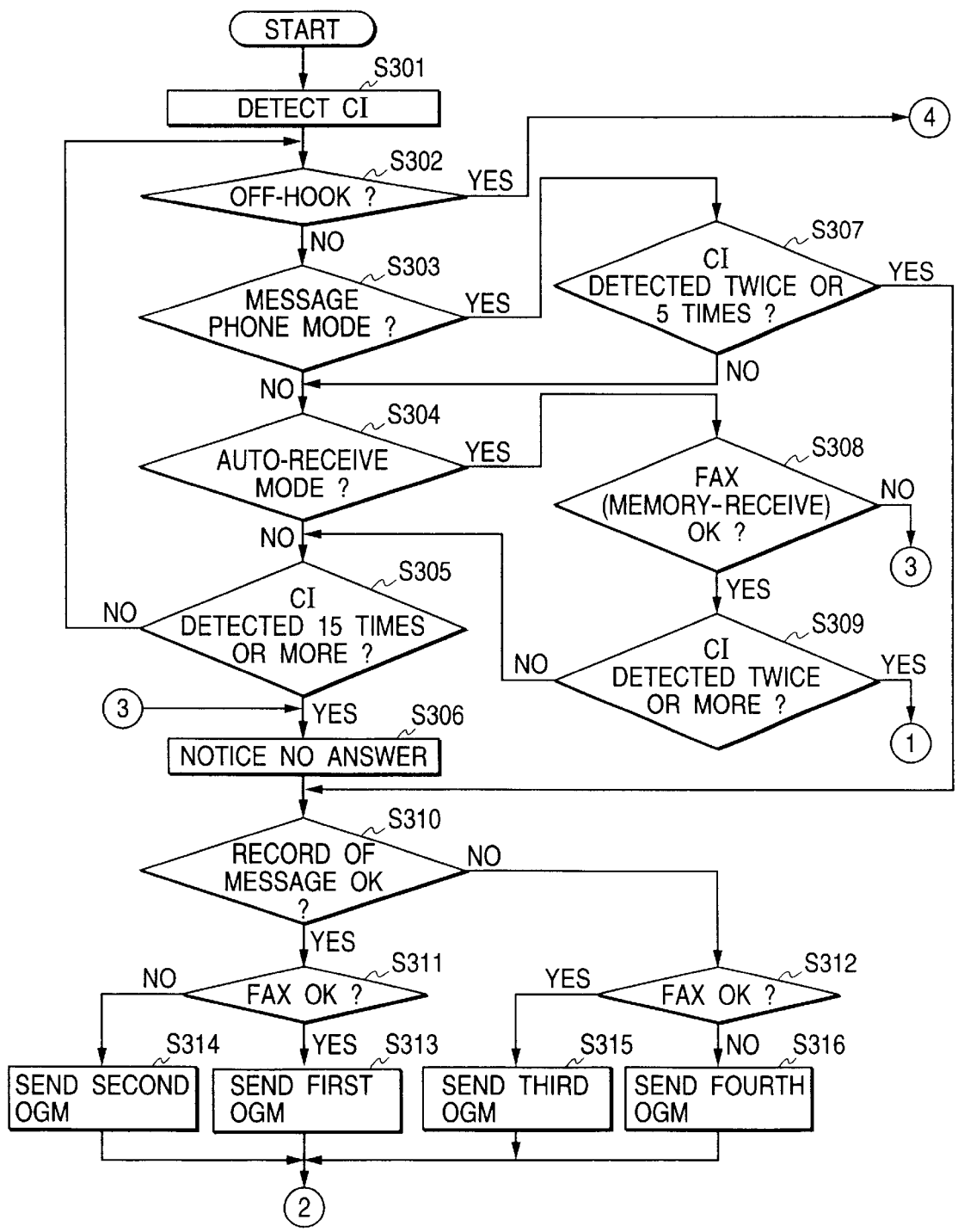

If the handset of the present apparatus or the subsidiary telephone unit is not off-hook in the step S302 in FIG. 3, the CPU 1 discriminates whether the present apparatus is set at the message telephone mode (step S303 in FIG. 3). The mode of the present apparatus is set by the user, utilizing the function key 17n, the volume/selection key 17i and the message record/reproduction key 17m, and the set mode is judged by the CPU 1.

In case the step S303 in FIG. 3 identifies that the present apparatus is set at the message telephone mode, if the CI signal is received twice or five times (step S307), there is discriminated the capacity of the flash memory 13 (steps S310, S311, S312). If the recording of the message and the memory reception in the facsimile communication are possible, there is transmitted a first OGM (outgoing message such as, in case of the message phone mode, "User is absent now. Please record your name and message by phone after a signal tone has been issued, please or transmit your message by facsimile") thereby informing a caller that the user is absent and also that the facsimile transmission is possible (step S313 in FIG. 3). Also if the memory recording alone is possible, a second OGM is transmitted to inform the caller that the message recording alone is possible and it is requested that the facsimile transmission may be tried later (step S314). Also if the facsimile reception alone is possible, a third OGM is transmitted to request the facsimile transmission and to request to relay the speech communication later (step S315). Also in case the message recording and the memory reception of the facsimile image are both not possible, a fourth OGM is transmitted to request to re-dial or retry the facsimile transmission (step S316).

The discrimination of the capacity of the flash memory 13 is achieved by the CPU 1, which constantly monitors the state thereof. The OGM mentioned above is transmitted to the telephone line 19.

In case the step S307 in FIG. 3 identifies that the number of received CI signals is twice or less than 5, or in case the step S303 identifies that the present apparatus is not set at the message telephone mode, the CPU 1 discriminates whether the present apparatus is set at an auto reception mode. If not, the CPU 1 discriminates whether the CI signal has been received 15 times, and, if received, the CPU 1 informs that the user is unable to respond to the call (step S306), and transmits different OGM's according to whether the message recording is possible and whether the memory reception is possible (steps S313–S316 in FIG. 3). If the step S305 identifies that the CI signal has not been received 15 times, the sequence returns to the step S302 in FIG. 3.

In case the step S304 in FIG. 3 identifies that the present apparatus set at the auto reception mode and the step S308 identifies that the memory reception is possible, the CPU 1 discriminates whether the CI signal has been received at least twice (step S309), and, if not received, the sequence proceeds to the step S305 in FIG. 3. Also if the step S308 identifies that the memory reception is not possible, the sequence proceeds to the step S306 in FIG. 3.

In case the step S309 identifies that the CI signal has been received twice or more, the CPU 1 discriminates whether the present apparatus is set at the auto reception mode (step S401 in FIG. 4), and, if set, the CPU 1 discriminates whether the memory reception is possible (step S402). If the present apparatus is not set at the auto reception mode or if the memory reception is not possible, the sequence proceeds to the step S306 in FIG. 3.

Figure 4:
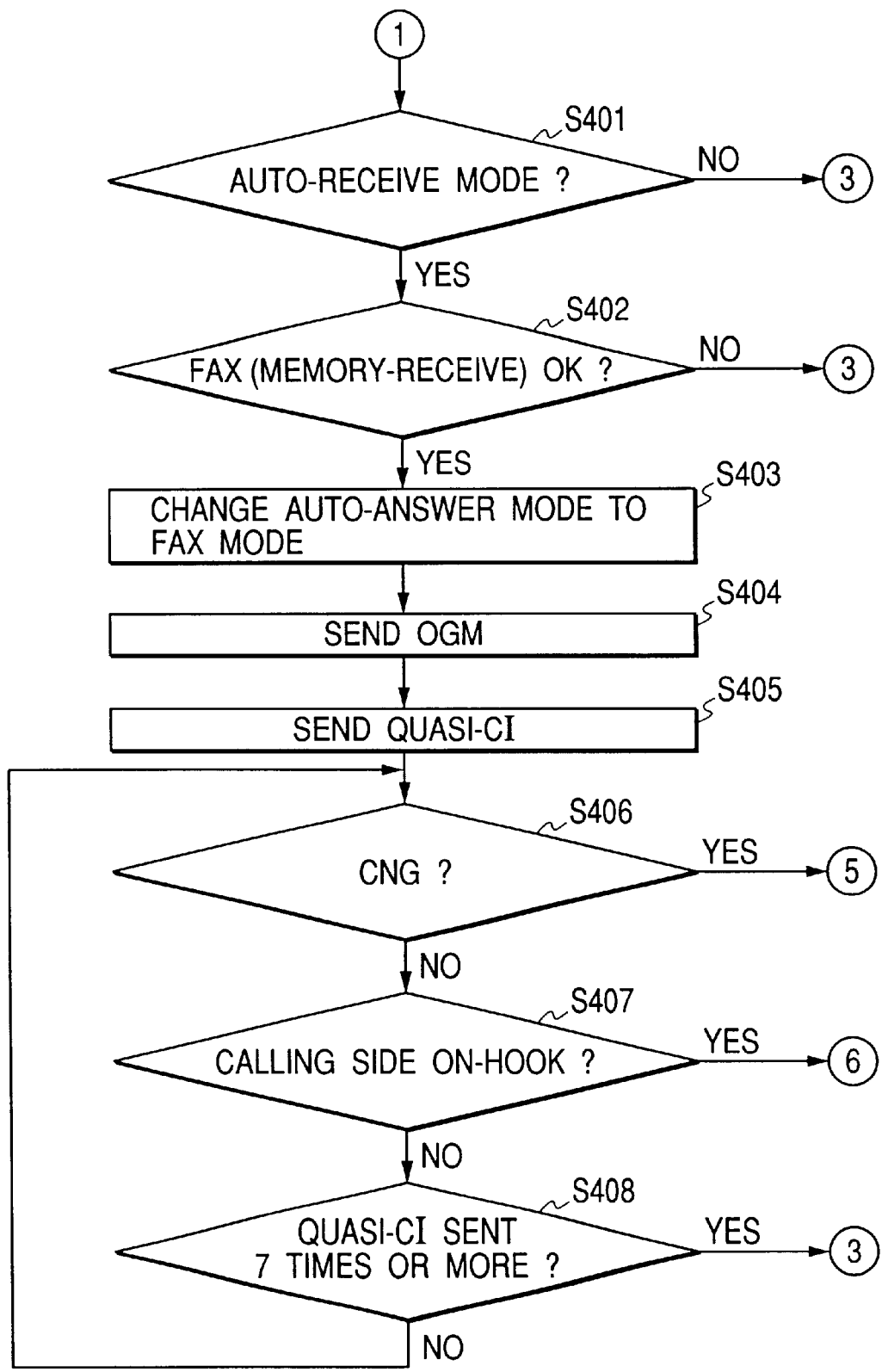

In case the above-mentioned step S402 in FIG. 4 identifies that memory reception is possible, the apparatus is shifted from the message telephone mode to a facsimile mode (F/T conversion; step S403) and an OGM is transmitted to prompt the facsimile transmission and requests that the message communication may be tried later (step S404). Then, for calling for the user, the MODEM 3 transmits a pseudo CI signal to the partner through telephone line 19 (step S405).

After the transmission of the OGM, the CPU 1 monitors a CNG signal (initial identification signal) indicating a facsimile terminal from the partner (step S406). If the CNG signal is detected, the OGM transmission is terminated (step S513 in FIG. 5), then the automatic reception (memory reception) is executed (step S514), and the NCU 4 disconnects the line (step S508). Also in case the on-hook state of the partner is detected before the CPU 1 detects the CNG signal (step S407 in FIG. 4), the NCU 4 disconnects the line (step S508 in FIG. 5). If the pseudo CI signal is detected 7 times (step S408 in FIG. 4), the sequence proceeds to the step S306 in FIG. 3. Also if the step S408 identifies that the pseudo CI signal has not been received 7 times, the sequence returns to the step S406 in FIG. 4.

After the transmission of the OGM in the steps S313–S316 in FIG. 3, if the CNG signal is detected (step S501 in FIG. 5) and if the memory reception of the facsimile image is possible (step S512), the CPU 1 terminates the OGM transmission (step S513), and executes the memory reception (step S514), thereby storing the received image in the flash memory 13. Upon completion of the reception, the NCU 4 disconnects the line (step S508). Also in case the step S512 in FIG. 5 identifies that the memory reception is impossible, the OGM transmission is terminated (step S515) and the NCU 4 disconnects the line (step S508).

Figure 5:
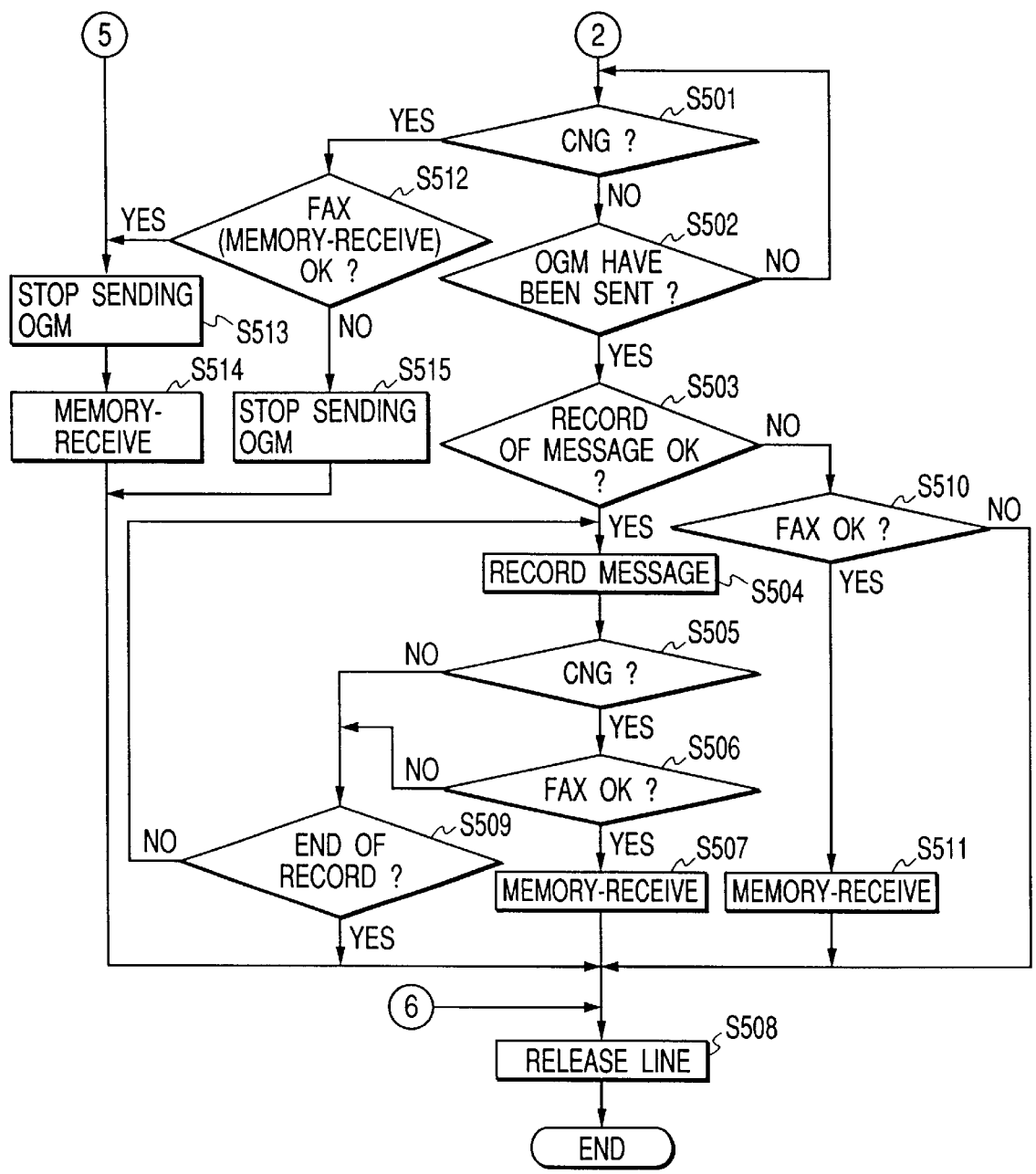

In case the step S501 in FIG. 5 does not detect the CNG signal, the CNG signal is monitored (step S501) until the OGM transmission is completed (step S502). In case the CNG signal is detected, the sequence proceeds to the step S512 in FIG. 5. If the CNG signal cannot be detected before the completion of the OGM transmission, the CPU 1 discriminates whether the message recording is possible, and, if possible (step S503 in FIG. 5), the message recording is executed (step S504). Even in the course of the message recording, the CPU 1 monitors the CNG signal (step S505).

If the CPU 1 does not detect the CNG signal (step S505 in FIG. 5) and does not detect the completion of the recording (step S509), the sequence returns to the aforementioned step S504. If the completion of the recording is detected (step S509), the NCU 4 disconnects the line (step S508). Also if the CPU 1 detects the CNG signal, whether the memory reception is possible is discriminated (step S506), and, if not possible, the NCU 4 disconnects the line (step S508) after the completion of the recording (step S509).

On the other hand, in case the step S506 in FIG. 5 identifies that the memory reception is possible, the CPU 1 resets the message recording mode and continues the memory reception (step S507), and the NCU 4 disconnects the line after the reception is completed (step S508). Also in case the step S503 in FIG. 5 identifies that the message recording is not possible, the CPU 1 discriminates whether the memory reception is possible (step S510), and, if possible, the memory reception is executed (step S511) and the NCU 4 disconnects the line after the completion of reception (step S508). Also in case the step S510 in FIG. 5 identifies that the memory reception is not possible, the NCU 4 disconnects the line without any process (step S508). The cutting-off of the connection in the step S508 completes the serial process in response to the call received from the partner.

Figure 7B:
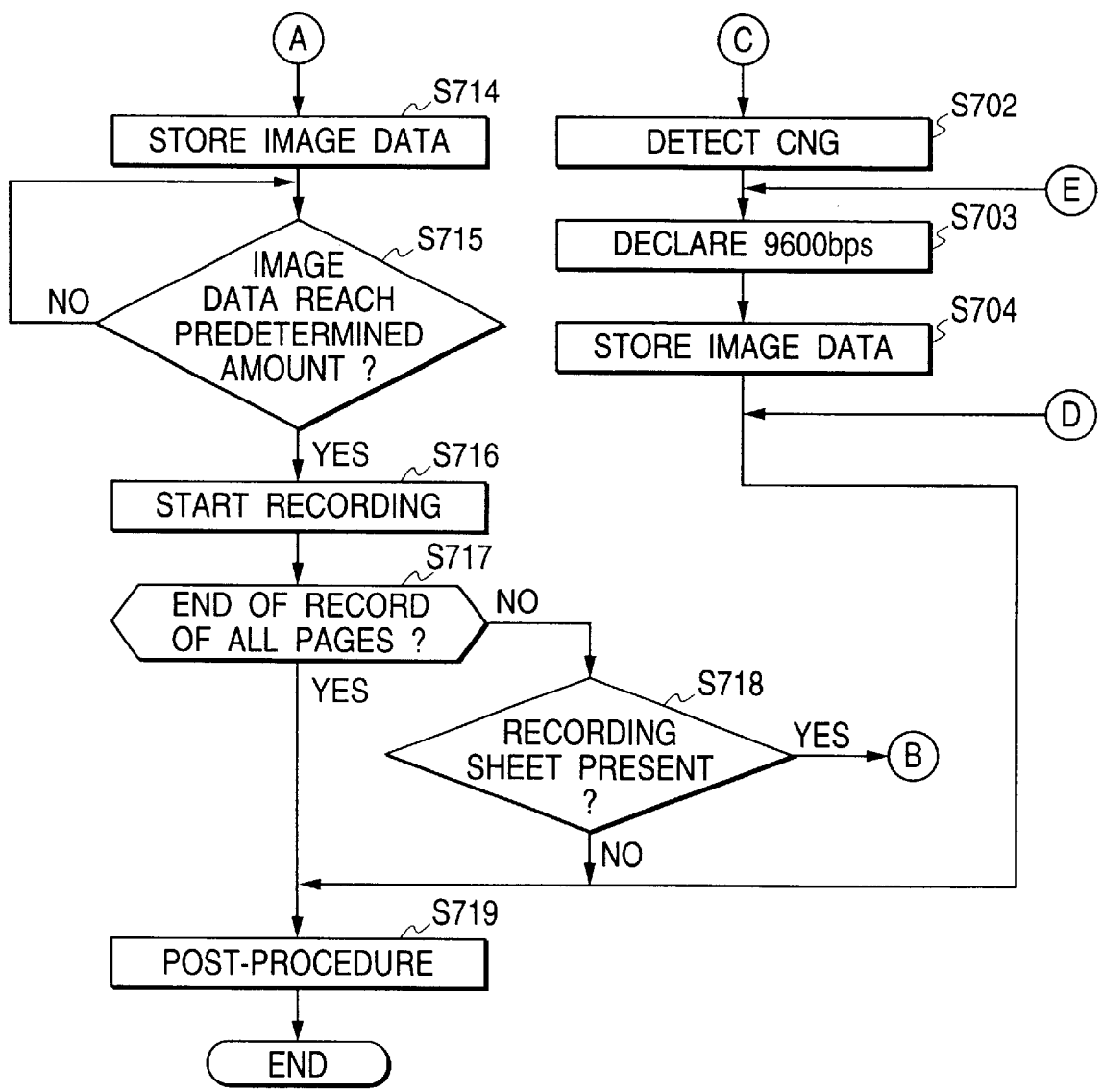
Figure 9B:
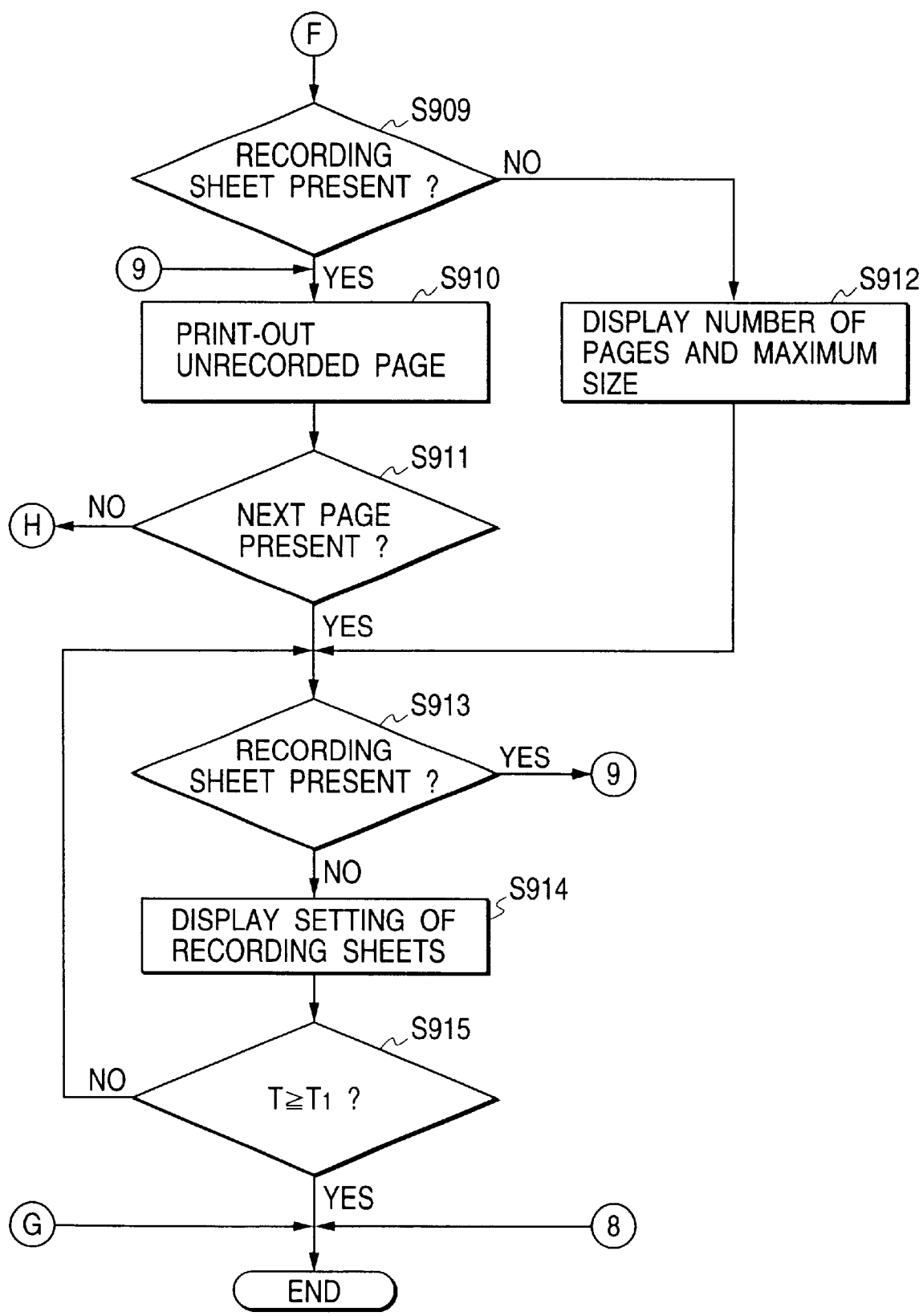

In the following there will be explained, with reference to FIGS. 7A and 7B, a direct receiving operation for the facsimile image. In such direct reception operation, the user is assumed, in response to a call received from the partner, to off hook the handset of the message telephone unit 5 or of a cordless telephone unit (not shown).

In response to a call received from the partner, the CPU 1 discriminates whether the present apparatus is set at the auto reception mode (step S701). If set, an ordinary facsimile procedure is executed to detect the CNG signal (step S702), declare a communication speed of 900 bps by a DIS (digital identification signal) from the MODEM 3 to the partner (step S703), store the received image in the flash memory 13 (step S704) and disconnect the line by the NCU 4 as a post-procedure for terminating the present process.

In case the aforementioned step S701 identifies that the present apparatus is not set at the auto reception mode, the CPU 1 discriminates whether the handset of the message telephone unit 5 or of the cordless telephone unit is on hook. If on hook, the NCU 4 disconnect the line as the post-procedure (step S719) and the present process is terminated. If off hook, the CPU 1 discriminates whether the FAX key 17q is depressed (step S706). If the FAX key 17q is not depressed for a predetermined time, an error message for requesting the depression of the FAX key 17q, for example, is given to the user by the display unit 18 or by the speaker 6 (step S710), and the sequence returns to the aforementioned step S705.

On the other hand, if the aforementioned step S706 identifies that the FAX key 17q is depressed, the CPU 1 discriminates whether the present apparatus is set at the direct reception mode (step S707). The direct reception mode can be set by the user through the operation unit 17. If not set at the direct reception mode, the present apparatus shifts to the auto reception mode and declares a communication speed of 9600 bps by sending the DIS signal to the partner (step S703). If set at the direct reception mode, the cartridge sensor 14 discriminates whether an ink (or toner) cartridge for image recording on the recording sheet is loaded on the recording unit 11 (step S708). If the ink cartridge is not loaded, an error message indicating the absence of the ink cartridge is given to the user (step S710) and the sequence returns to the aforementioned step S705.

In case the ink (or toner) cartridge is loaded in the recording unit 11, the recording sheet sensor 15 discriminates the presence of the recording sheet (step S709). If absent, an error message indicating the absence of the recording sheet is given to the user (step S710) and the sequence returns to the aforementioned step S705. If the recording sheet is present, the cartridge sensor 14 judges the kind (color or monochromatic) of the ink (or toner) cartridge loaded in the recording unit 11 (step S711). If a monochromatic ink cartridge is loaded in the recording unit 11, the MODEM 3 declares it to the partner by the DIS as a pre-procedure of the facsimile communication protocol that the communication can be executed with a speed of 4800 bps (step S712). On the other hand, if a color ink cartridge is loaded in the recording unit 11, the MODEM 3 declares it to the partner by the DIS as the pre-procedure of the facsimile communication protocol that the communication can be executed with a speed of 2400 bps (step S713).

In the following it will be described that the communication speed declared to the partner in the present embodiment is different depending on the mode set in the present apparatus or the kind of the ink (or toner) cartridge loaded in the recording unit 11.

The number of the nozzles discharging the black ink is different between the monochromatic and color ink cartridges and is less in case of the latter. Consequently, the amount of recording at a time is also less in case of the latter. In the direct receiving operation in which the image is simultaneously received and recorded, if the communication speed is higher than the recording speed, the amount of image data transmitted per unit time from the partner becomes larger than the amount of the recorded image data to induce an overflow of the memory, whereby the receiving apparatus becomes unable to process the images transmitted in succession. On the other hand, the monochromatic cartridge can record a larger amount at a time in comparison with the color cartridge and can therefore cope with the communication speed to a certain level.

In the memory reception mode, the maximum communication speed of the apparatus can be utilized since the received image is stored in the memory without being recorded.

For this reason, the communication speed declared to the partner is varied depending on the selected mode or the kind of the ink (or toner) cartridge.

After the declaration of the communication speed in the aforementioned steps S712 and S713, the received image is stored in the DRAM 12 (step S714).

In case of manual reception, since there is executed direct reception where the image is recoreded while it is received, the capacity of the DRAM 12 is smaller than that of the flash memory 13. More specifically, though the nominal capacity is 4 MB both in the DRAM 12 and the flash memory 13, the capacity of the DRAM 12, being only partly used, is less than that of the flash memory 13.

When the received image of a predetermined amount is stored in the DRAM 12 (step S715), it is transferred to the recording unit 11 and recorded on the recording sheet (step S716). After the transfer of the received image to the recording unit 11, the DRAM 12 becomes empty, and then another image is received from the partner and is stored in the DRAM 12. These procedures are repeated until the entire image from the partner is received and recorded. After the recording of all the pages, the communication is terminated (step S717), and the NCU 4 disconnects the line as the post-procedure (step S719) to terminate the present sequence. In case the recording sheet sensor 15 detects that the recording sheet is exhausted in the course of recording of the received image (step S718), a reception error is informed to the partner and the NCU 4 disconnects the line as the post-procedure (step S719) to terminate the present process. If the aforementioned step S718 identifies the presence of the recording sheet, the sequence returns to the aforementioned step S714 to store the received image in the DRAM 12.

The serial process for direct reception is completed in the above-explained manner. In case the aforementioned step S708 identifies that the ink (or toner) cartridge is not loaded in the recording unit 11, it is also possible to shift to the automatic reception if a surplus capacity is available in the flash memory 13 and to inform the user of the fact that an unrecorded portion of the image is stored in the flash memory 13.

In the following there will be explained, with reference to flow chart in FIGS. 8 to 12, recording and erasing processes for the facsimile image received in the memory reception mode.

If a new image is received by memory reception, the fact of such reception and the number of received facsimile cases are displayed on the display unit 18 and informed to the user, so that the user can recognize the memory reception without any particular operation. This procedure will be explained with respect to FIG. 8.

The CPU 1 discriminates whether the received facsimile image is stored in the flash memory 13 (step S801), and, if not stored, the present sequence is terminated without any process. If stored, the CPU 1 discriminates whether the facsimile image is still unrecorded (whether unrecorded pages still exist) (step S802) The judgment whether the facsimile image is still unrecorded is made by setting a pointer corresponding to the received image at the reception thereof and checking such pointer by the CPU 1.

If the aforementioned step S802 identifies the absence of the unrecorded pages, the present sequence is terminated without any process. If an unrecorded page is identified, the CPU 1 causes the FAX key 17$q$ to flicker (step S803). The FAX key 17$q$ is composed of a translucent key member where a light emitting member such as a light emitting diode is mounted.

Then the CPU 1 discriminates whether the unrecorded page has been recorded (step S804), and, if not, continues the flickering of the FAX key 17$q$ (step S803). If recorded, the CPU 1 terminates the flickering of the FAX key 17$q$ (step S805) and the present sequence is terminated.

Though not illustrated in FIG. 8, it is also possible, in case an unreproduced message remains, to construct the message recording/reproduction key 17$m$ in the same manner as the FAX key 17$q$ and to cause such message recording/reproduction key 17$m$ to flicker.

In case the user wishes to recognize the memory reception and record the image received by the memory reception, the user depresses the FAX key 17$q$ on the operation unit 17. The operations in such case will be explained in the following with reference to FIGS. 9A and 9B.

The CPU 1 discriminates whether the FAX key 17$q$ is depressed, until such depression takes place (step S901). When the FAX key 17$q$ is depressed, the CPU 1 discriminates whether the facsimile image received by the memory reception is present in the flash memory (step S902). If absent, the state of such absence is informed to the user by the display unit 18 or by the speaker 6 (step S903), and the sequence returns to the step S901. On the other hand, if the aforementioned step S902 identifies the presence of the facsimile image received by memory reception, the CPU 1 displays, on the display unit 18, a message such as "print *all, #search" in order to cause the user to select either the collective recording of all the facsimile images stored in the flash memory 13 or the selective recording of the desired facsimile image (step S904).

If the collective recording is selected by the user through the operation 17 in the aforementioned step S904, the CPU 1 discriminates whether a facsimile image remains unrecorded (whether an unrecorded page exists) (step S905). If all the facsimile images stored in the flash memory 13 have been recorded at least once, the absence of a new facsimile image is transmitted to the user through the display unit 18 or the speaker 6. Subsequently, the fact that all the facsimile images are recorded is also transmitted through the display unit 18 or the speaker 6, and all the facsimile images are recorded on the recording sheets by the recording unit 11 (step S906).

After the recording operation, a questioning message whether all the recorded facsimile images ought to be erased is given through the display unit 18 to the user (step S907). If the user selects the erasure by the operation unit 11, the CPU 1 erases all the facsimile images (step S908) and the presence sequence is terminated. In case the user does not select the erasure in the aforementioned step S907, the presence sequence is terminated without any process.

In case the aforementioned step S905 identifies the presence of an unrecorded facsimile image (unrecorded page), the recording of such new facsimile image is displayed on the display unit 18 and such facsimile image alone is recorded. More specifically, at first the recording sheet sensor 15 discriminates whether the recording sheet is set (step S909), and, if set, the facsimile image of a first page is recorded on the recording sheet (step S910). Then the CPU 1 discriminates whether a succeeding page is present (step S911), and, if absent, the sequence proceeds to the aforementioned step S907. Upon completion of the recording operation, the completion of the recording operation is informed to the user through the display unit 18 or the speaker 6. In case the aforementioned step S911 identifies the presence of a succeeding page, the CPU 1 discriminates whether the recording sheet is set (step S913).

On the other hand, in case the aforementioned step S909 identifies the absence of the recording sheet, a message requesting the setting of the recording sheet is given to the user through the display unit 18 or the speaker 6, and the number of pages of the unrecorded facsimile image and the size (maximum size) thereof are also informed to the user by the display unit 18 (step S912). The number of pages and the size of the unrecorded facsimile image are detected by the CPU 1.

As soon as the recording sheet is set by the user and such setting is detected by the recording sheet sensor 15 (step S913), the unrecorded facsimile image is recorded (step S910). In case the step S913 identifies that the recording sheet is not set, a message requesting the setting of the recording sheet is informed to the user by a display on the display unit 18 (step S914). Then the CPU 1 discriminates whether a predetermined time T1 (for example, one minute) elapses after the display of such message requesting the setting of the recording sheet on the display unit 18 (step S915), and, if not, the sequence returns to the step S913. Also, if the recording sheet is not set even after the lapse of the predetermined time T1 from the display of such requesting message, it is regarded as an error and the present sequence is terminated. In case of executing the recording operation again, the sequence is started from the beginning. Also in case the recording sheet is exhausted in the course of recording operation of the facsimile images, a message requesting the supplemental of the recording sheet is-given to the user by a display on the display unit 18.

The unrecorded facsimile image as mentioned above includes a facsimile image not recorded over the entire page and a facsimile image not partially recorded on a page for some reason in the course of recording.

In case the user does not select the collective recording in the aforementioned step S904, the sequence is shifted to a search recording operation in which the user selects an image or images for recording among the received facsimile images, as will be explained in the following with reference to FIG. 10.

If the step S904 selects the search recording, the CPU 1 displays, on the display unit 18, the number of receptions, date and time of reception of the facsimile images initially stored in the flash memory 13, for example in a form of "1 case, 10/8 10:26" (step S1001). If the first facsimile image is not desired by the user, the type of the key depressed by the user is discriminated (step S1002). If the set key 17r or the FAX key 17q is depressed, the sequence proceeds to a step S1008 to be explained later. If these keys are not depressed but the volume/selection key 17i is depressed, a search process is executed (step S1003), and the facsimile image of a next case is displayed on the display unit 18 (step S1004). In order to search a desired facsimile image among the plural images stored in the flash memory 13, the volume/selection key 17i is depressed in succession until the desired facsimile image is displayed on the display unit 18 (steps S1003 to S1005).

When the facsimile image of the desired case is searched and the set key 17r or the FAX key 17q is depressed, the display unit 18 displays a message requesting the user to select whether the facsimile message of the desired case should be recorded or erased (step S1007). If the user depresses the volume/selection key 17i without selecting the recording or the erasure, the display unit 18 displays the number of pages and the size of such facsimile image (step S1009). Then, if the user further depresses the volume/selection key 17i (step S1010), the display unit 18 displays the telephone number of the communication partner (step S1011). This telephone number is transmitted by a TSI (transmission side identification) signal (a signal for sending a telephone number of a calling side to a called side) of the facsimile communication protocol. In case the telephone number has not been transmitted from the partner by such TSI signal, a message "not transmitted" is displayed on the display unit 18.

The facsimile image of the desired case can be easily searched by the above-explained procedure.

If the volume/selection key 17i is depressed after the display of the telephone number in the step S1010, the sequence returns to the step S1007.

In case the volume/selection key 17i is not depressed in the aforementioned step S1008, the sequence proceeds to a process shown in FIG. 11, in which, in a step S1101, the CPU 1 discriminates whether the recording (print) is selected. If the recording is selected, the CPU 1 discriminates whether the facsimile image of the desired case contains plural pages (step S1102). If the facsimile image of the desired case consists of a single page, such facsimile image is recorded (step S1110) and the present sequence is terminated. If the step S1102 identifies that the facsimile image of the desired case consists of plural pages, the user can designate the pages to be recorded among such plural pages.

The CPU 1 discriminates whether the user has designated the page to be recorded, and, if not, the sequence proceeds to the recording operation in the aforementioned step S1110. On the other hand, in case the page has been designated in the step S1103, the recording start page and the recording end page are entered through the operation unit 17 (step S1104). Then the CPU 1 discriminates, in succession, whether the erasure key 17i is depressed (step S1105), whether the function key 17n is depressed (step S1106), whether the set key 17r or the FAX key 17q is depressed (step S1107) and whether the page input contains an error (step S1108).

If neither the erasure 17j nor the function key 17n is depressed, but the set key 17r or the FAX key 17q is depressed and the page input does not contain an error, the sequence proceeds to the recording operation in the step S1110. If the aforementioned step S1107 identifies that the set key 17r or the FAX key 17q is depressed, the sequence returns to the step S1105. Also if the aforementioned step S1108 identifies that the page input contains an error, an error sound is generated from the speaker 6 as a warning to the user when the set key 17r or the FAX key 17q is depressed (step S1109) and the sequence then returns to the step S1103.

Also in case the aforementioned step S1105 identifies that the erasure key 17j is depressed before the depression of the set key 17*r* or the FAX key 17*q* in the step S1107 the sequence returns to the step S1103. Also in case the aforementioned step S1106 identifies that the function key 17*n* is depressed before the depression of the set key 17*r* or the FAX key 17*q* in the step S1107 the sequence returns to the step S1001 in FIG. 10.

Figure 12:
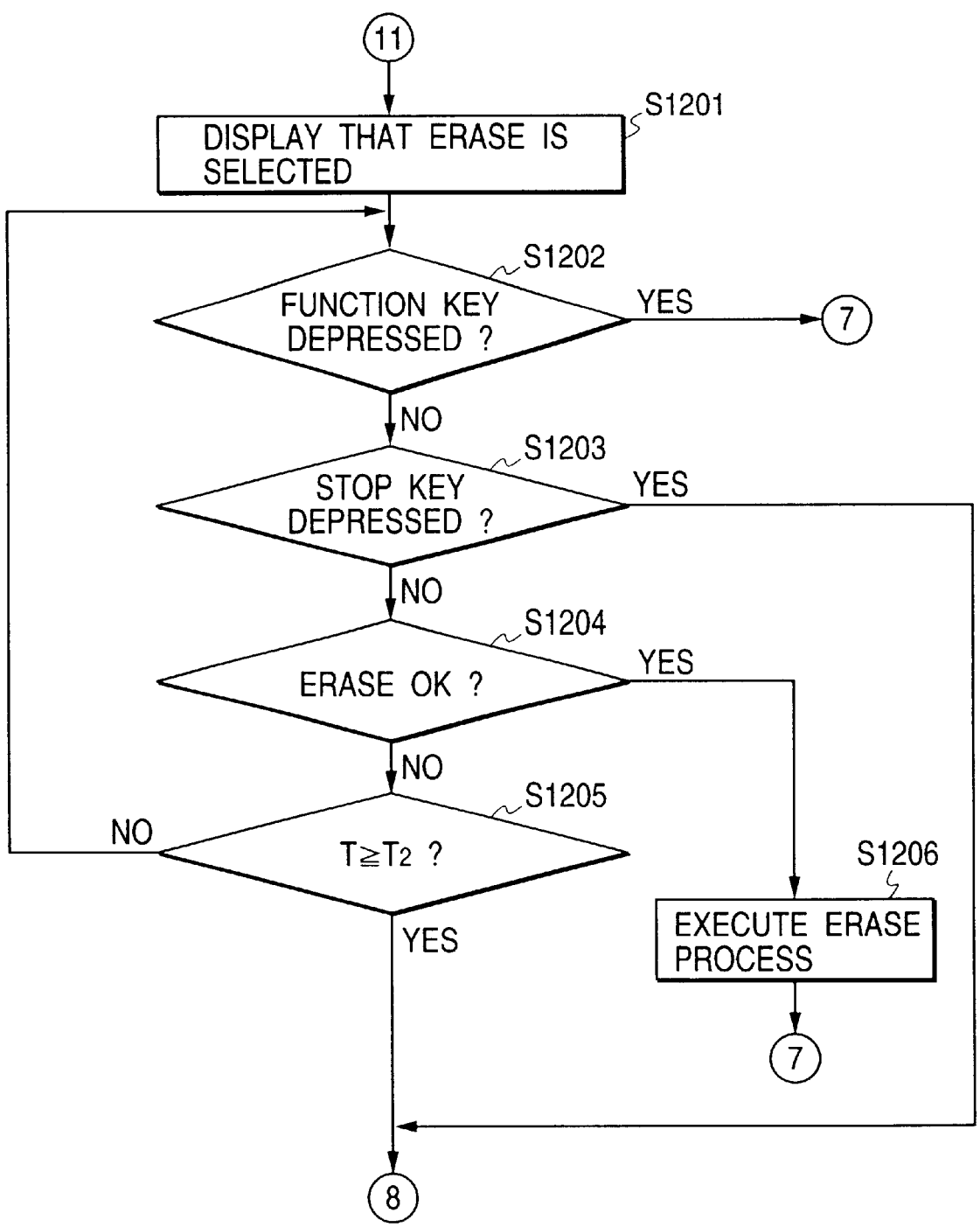

In case the aforementioned step S1101 selects the erasure, the sequence shifts to a process in FIG. 12. More specifically, when the step S1101 selects the erasure, the CPU 1 displays a message indicating the selection of the erasure on the display unit 18 (step S1201). Then, the CPU 1 discriminates, in succession, whether the function key 17*n* is depressed (step S1202) and whether the stop key 17*p* is depressed (step S1203). If the step S1202 identifies the depression of the function key 17*n*, the sequence returns to the step S1001 in FIG. 10. If the step S1203 identifies the depression of the stop key 17*p*, the present sequence is terminated.

If the steps S1202 and S1203 identify that the function key 17*n* and the stop key 17*p* are not depressed, respectively, the CPU 1 displays, on the display unit 18, a message requesting to confirm the user the erasure (step S1204). If the user selects the erasure, the erasure is executed and a message such as "the erasure is completed" is displayed on the display unit 18 (step S1206) and the sequence returns to the step S1001 in FIG. 10. On the other hand, if the confirmation for the erasure is not obtained in the step S1204, the CPU 1 discriminates the lapse of a predetermined time T2 (step S1205). If the predetermined time T2 has not elapsed, the sequence returns to the step S1202. But, if the predetermined time T2 has elapsed, the present sequence is terminated.

The recording and erasure of the facsimile image received by memory reception are completed in this manner.

Figure 13:
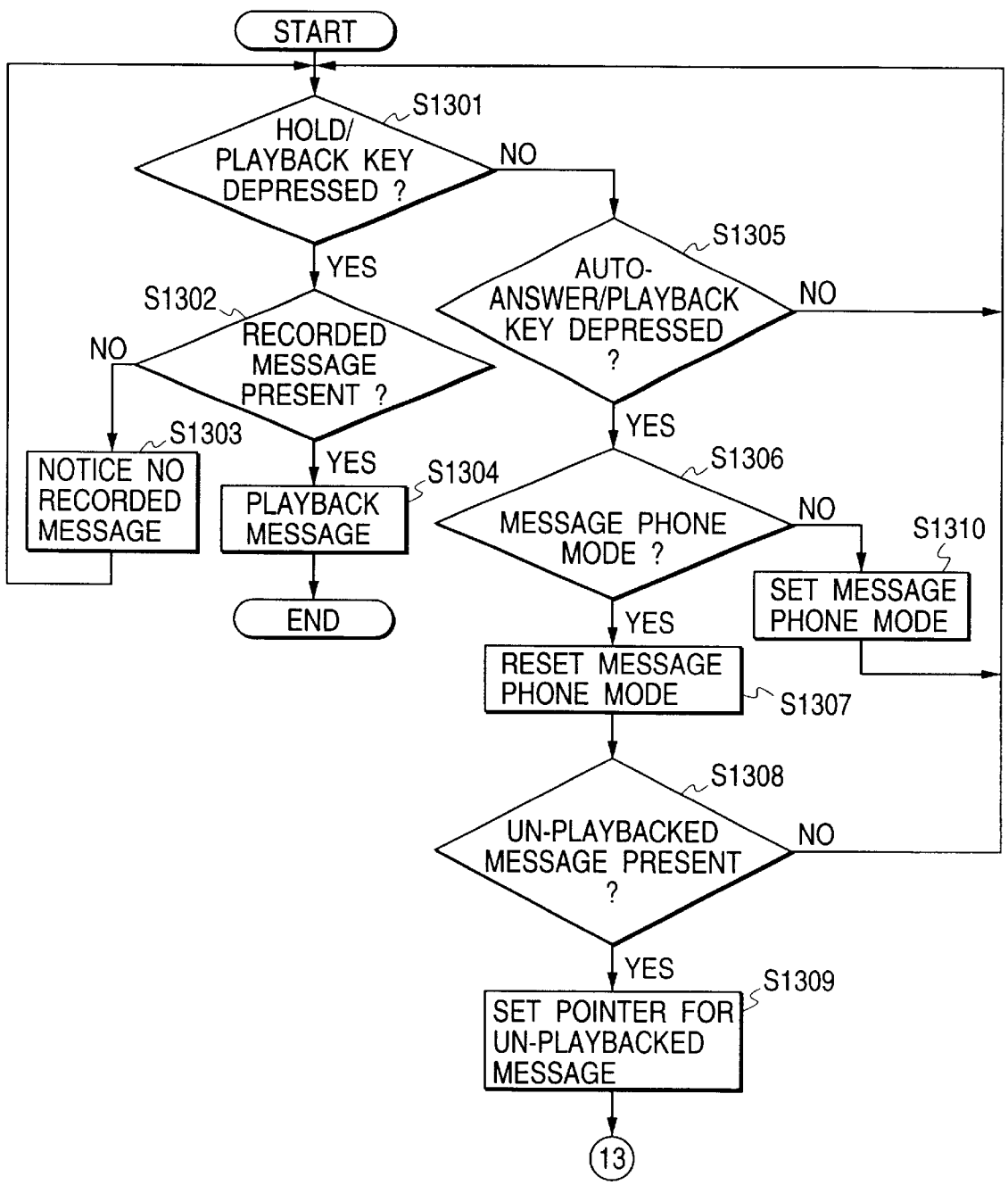
FIGS. 13 and 14 are flow charts showing operations for reproducing and erasing massages for a message phone stored in a flash memory in the above-mentioned image communication apparatus.

In the following there will be explained, with reference to FIGS. 13 and 14, the reproducing and erasing process for the message recorded in the message telephone unit 5.

At first the CPU 1 discriminates whether the hold/message reproduction key 17*k* is depressed for reproducing the message recorded in the message telephone unit 5 (step S1301). If depressed, the CPU 1 discriminates whether the recorded message is present (step S1302). If present, all the messages and the recorded dates are reproduced (step S1304), and the present sequence is then terminated. In case the step S1302 identifies the absence of the recorded message, a message indicating the absence of the recorded message is given to the user by the speaker 6 or the display unit 18, and the sequence returns to the step S1301.

In case the step S1301 identifies that the hold/message reproduction key 17*k* is not depressed, the CPU 1 discriminates whether the message record/reproduction key 17*m* is depressed (step S1305), and, if not, the sequence returns to the step S1301. Also in case the step S1305 identifies the depression of the hold/message reproduction key 17*m*, the CPU 1 discriminates whether the present apparatus is set at the message telephone mode (step S1306), and, if not, the message telephone mode is set (step S1310) and the sequence then returns to the step S1301.

On the other hand, if the aforementioned step S1306 identifies that the present apparatus is set at the message telephone mode, the message telephone mode is released (step S1307) and the CPU 1 discriminates whether the unreproduced message is present among the messages recorded in the flash memory 13 (step S1308). If the unreproduced message is absent among the messages recorded in the flash memory 13, the sequence returns to the step S1301. If the unreproduced message is present, the CPU 1 sets a pointer on such message (step S1309) and the sequence proceeds to a process shown in FIG. 14.

Figure 14:
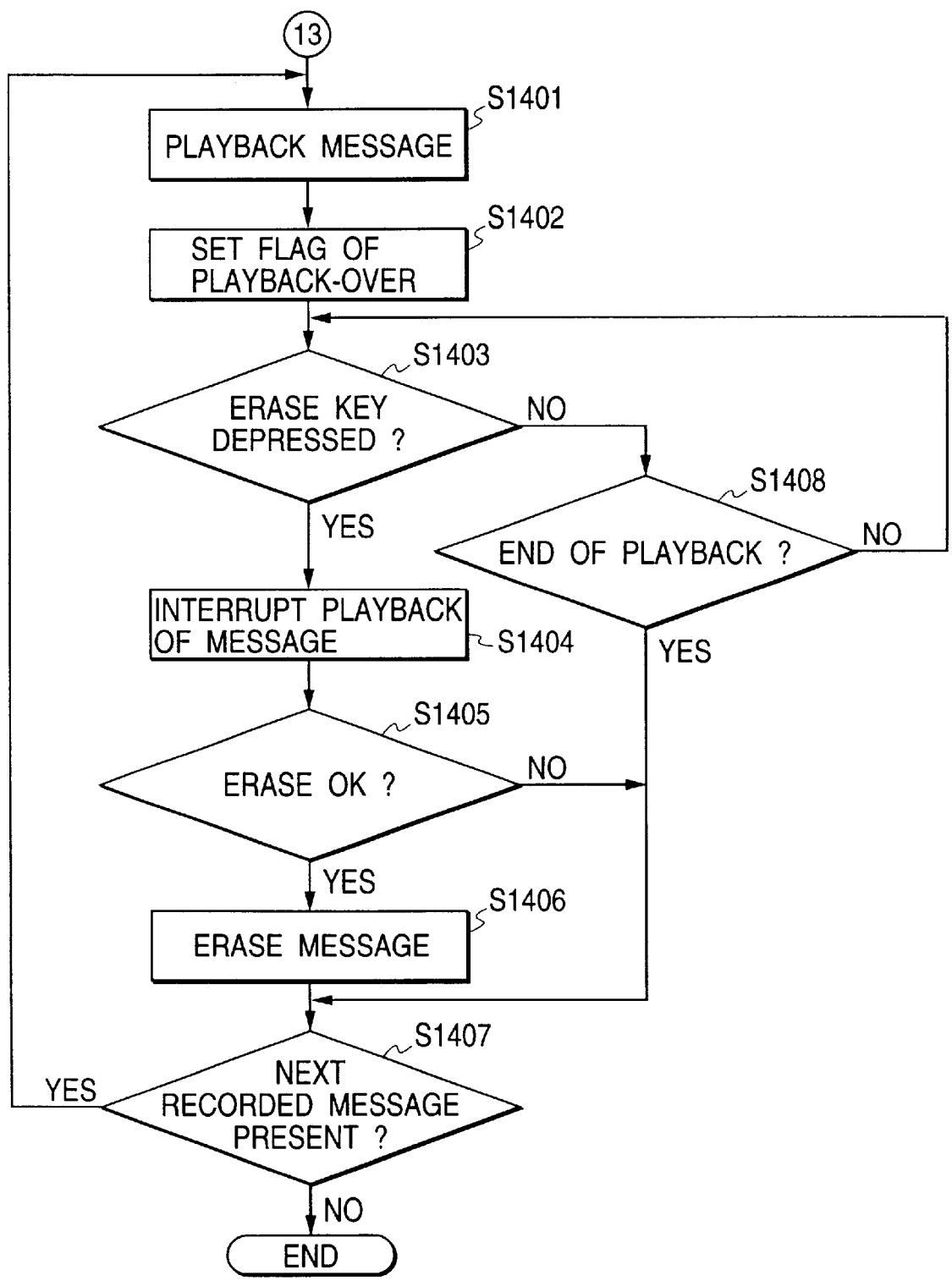

Referring to FIG. 14, the CPU 1 in a step S1401 reproduces the message on which the pointer has been set, and, after the reproduction, a flag indicating the completion of reproduction is set (step S1402). In the course of the reproduction, the CPU 1 discriminates whether the erasure key is depressed (step S1403), and, if depressed, interrupts the reproduction of the message (step S1404) and asks the user whether the message ought to be erased (step S1405). If the message ought to be erased, the message of which reproduction is interrupted is erased (step S1406). If the message ought not to be erased, the message is left in the flash memory 13 and the CPU 1 discriminates whether a next message is present (step S1407). If the next message is present, the sequence returns to the aforementioned step S1401, but, if absent, the present sequence is terminated.

On the other hand, in case the step S1403 identifies that the erasure key is not depressed, the CPU 1 discriminates whether the reproduction of the message is completed. If not, the sequence returns to the step S1403, but, if completed, the sequence proceeds to the step S1407 in which the CPU 1 discriminates whether a next message is present.

In the above-explained configuration, the unreproduced message is reproduced in case the message record/reproduction key 17*m* is depressed while all the messages are reproduced in case the hold/message reproduction key 17*k* is depressed. But, it is also possible to reproduce the unreproduced message in response to the depression of the hold/message reproduction key 17*k* and to reproduce all the messages in response to the depression of the message record/reproduction key 17*m*.

As explained in the foregoing, the reproduction of the messages can be achieved in two manners, so that it is possible to select the reproducing method such as collective reproduction of all the messages or selective reproduction of the unreproduced message only, according to the purpose of the user, and it is furthermore possible to cope with the error in the operation of the user.

In the foregoing, there have been explained the erasure process in the search of the facsimile image received by memory reception and the erasure process in the course of reproduction of the messages. In the following there will be explained, with reference to FIGS. 15A, 15B and 16, the collective erasure of the received facsimile image and the recorded message.

At first the state of use of the flash memory 13 is checked. In the same manner as the OGM transmission pattern varies according to the empty capacity of the flash memory 13, the operation of the collective erasing mode of the flash memory 13 varies according to the empty capacity thereof.

At first, in a step S1501 in FIG. 15A, the CPU 1 discriminates whether the erasure key 17*j* on the operation unit 17 is depressed. If the erasure key is depressed, the CPU 1 discriminates whether a message or a facsimile image is present in the flash memory 13 (S1502). If the message or the facsimile image is absent in the flash memory 13, the present sequence is terminated. If the step S1502 identifies the presence of the message or the facsimile image in the flash memory 13, the CPU 1 discriminates whether both the message and the facsimile image are present in the flash memory 13 (step S1503). If both are present, a message requesting the selection of the erasure of either one is given to the user by a display on the display unit 18, and, according to the key input by the user, whether the collective erasure mode for the messages or the collective erasure mode for the facsimile images is determined (step S1504). If the collective message erasure mode is selected, the CPU 1 discriminates whether the collective message erasure mode has been selected consecutively throughout the serial operations of this sequence (step S1505). Such consecutive selections have not been made in this stage since it is the first step in the serial operation. Then, confirmation is made to the user whether the messages ought to be collectively erased (step S1506). On the display unit 18, there is displayed a message requesting the confirmation that the messages ought to be collectively erased, and, in response to an input that the messages ought to be collectively erased, entered by the user through the operation unit 17, the messages are collectively erased (step S1507) and the sequence proceeds to a step S1508. On the other hand, if the user enters an input for canceling the collective erasure of the messages through the operation unit 17, the collective message erasure mode is canceled and the sequence proceeds to a step S1508. If the messages are collectively erased, the display unit 18 displays a message indicating the completion of the collective erasure of the messages, for the user.

In the step S1508, the CPU 1 discriminates whether the facsimile image is present in the flash memory 13, and, if not, the present sequence is terminated. If the step S1508 identifies the presence of the facsimile image in the flash memory 13, the sequence returns to the step S1504.

In case the user makes the same selection as in the foregoing step S1505 in the serial operation of the collective message erasure mode, namely, for example, if the collective message erasure mode is selected again after the messages have been collectively erased, a message that the messages have already been collectively erased is given to the user by the display unit 18 or by the speaker 6 (step S1509) and the sequence returns to the step S1504.

Also in case the collective erasure mode for the facsimile images is selected in the foregoing step S1504, there is executed a process similar to that of the collective message erasure mode explained above. More specifically, if the collective facsimile image erasure mode is selected in the step S1504, the CPU 1 discriminates whether the collective facsimile image erasure mode has been selected consecutively throughout the serial operations of this sequence (step S1510). Such consecutive selections have not been made in this stage since it is the first step in the serial operations. Then confirmation is made to the user whether the facsimile images ought to be collectively erased (step S1511). On the display unit 18, there is displayed a message requesting the confirmation that the facsimile images ought to be collectively erased, and, in response to an input that the facsimile images ought to be collectively erased, entered by the user through the operation unit 17, the facsimile images are collectively erased (step S1512) and the sequence proceeds to a step S1513. On the other hand, if the user enters an input for canceling the collective erasure of the facsimile images through the operation unit 17, the collective facsimile image erasure mode is canceled and the sequence proceeds to a step S1513. If the facsimile images are collectively erased, the display unit 18 displays a message indicating the completion of the collective erasure of the facsimile images.

In a step S1513, the CPU 1 discriminates whether the message is stored in the flash memory 13, and, if not, the present sequence is terminated. If the step S1513 identifies that the message is stored in the flash memory 13, the sequence returns to the foregoing step S1504.

In case the user makes the same selection as in the foregoing step S1510 in the serial operations of the collective facsimile image erasure mode, namely, for example, if the collective facsimile image erasure mode is again selected after the facsimile images have been collectively erased, a message that the facsimile images have already been collectively erased is given to the user by the display unit 18 or by the speaker 6 (step S1514) and the sequence returns to the step S1504.

If the aforementioned step S1502 identifies the absence of both the message and the facsimile image in the flash memory 13, the present sequence is terminated. On the other hand, if the step S1503 identifies that the flash memory 13 stores either the message or the facsimile image, there is assumed a collective erasure mode for the messages or the facsimile images and the sequence proceeds to a process shown in FIG. 16.

Figure 16:
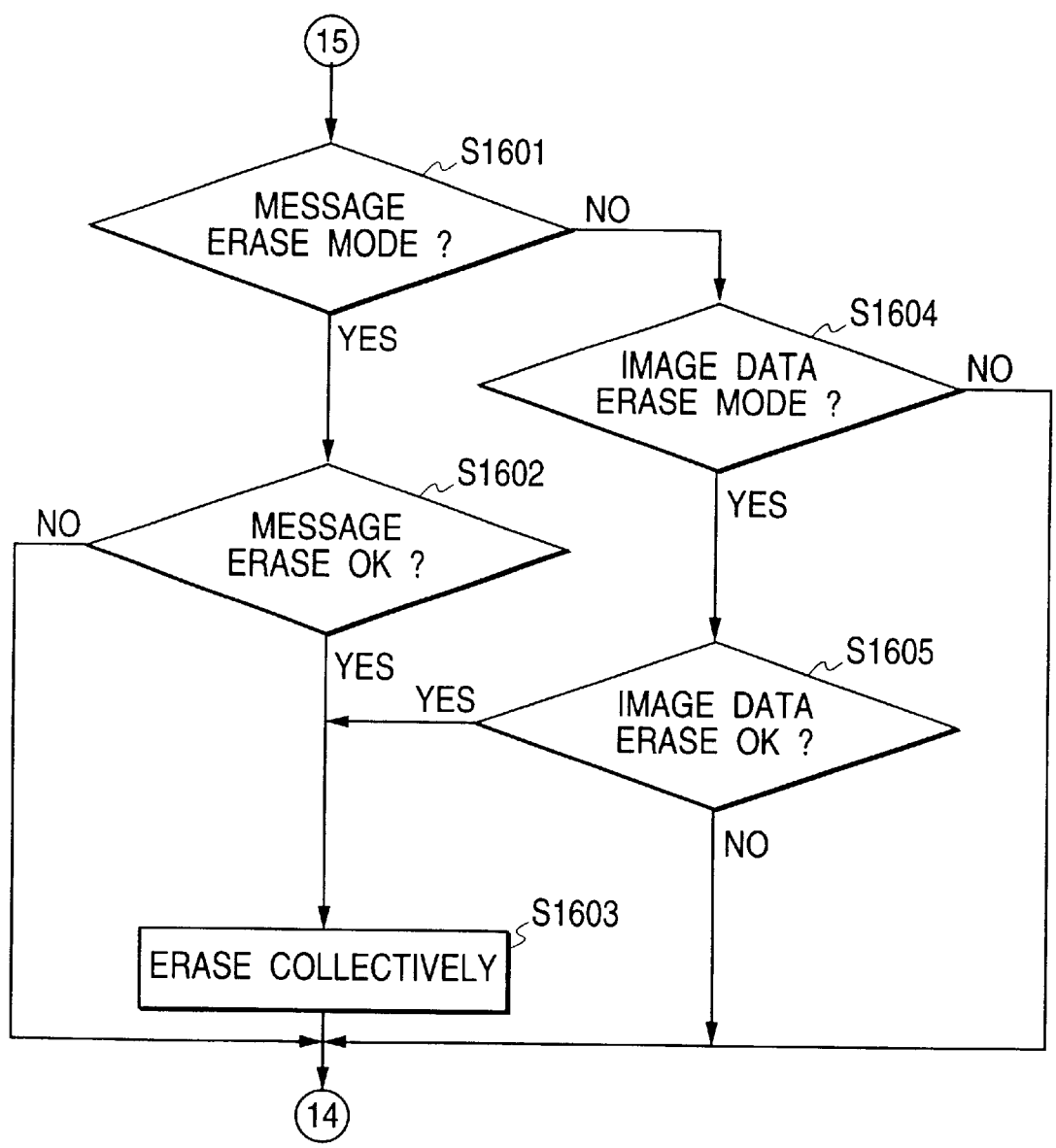
FIG. 16 is a flow chart showing an operation for collectively erasing the facsimile images and the messages stored in the message phone in the above-mentioned image communication apparatus.

In FIG. 16, the CPU 1 discriminates the message erasure mode or the facsimile image erasure mode (step S1601), and, in case of the message erasure mode, a confirmation is made to the user whether the messages ought to be erased (step S1602), and, if the messages ought to be erased, the messages are collectively erased (step S1603) and the present sequence is terminated. On the other hand, if the step S1602 identifies that the messages ought not to be erased, the collective message erasure mode is canceled and the present sequence is terminated.

In case the step S1601 identifies that the message erasure mode is not selected, the CPU 1 discriminates whether the facsimile image erasure mode is selected (step S1604), and, if selected, there is confirmed to the user whether the facsimile image ought to be erased (step S1605). If the facsimile image ought to be erased, the facsimile images are collectively erased (step S1603), and the present sequence is terminated. On the other hand, if the step S1605 identifies that the facsimile images ought not to be erased, the collective facsimile image erasure mode is canceled and the present sequence is terminated. Also the present sequence is terminated in case the foregoing step S1604 identifies that the facsimile image erasure mode is not selected.

If the messages or the facsimile images are collectively erased, a message indicating such erasure is displayed on the display unit 18.

In the present invention, the state of use of the flash memory 13 is constantly monitored as explained in the foregoing, and such monitoring may be utilized for always informing the user of the state of use of the flash memory 13.

In the following there will be explained, with reference to FIG. 17, a process of monitoring the state of use of the flash memory 13.

There are determined, in advance, the number of the messages recordable in the flash memory 13 (assumed to be 20 cases in the present embodiment), the number of the facsimile images receivable by the memory reception (assumed to be 20 cases in the present embodiment), and the number of pages of such image (assumed to be 20 pages in the present embodiment). On the other hand, the physical capacity of the flash memory 13 is determined in advance (assumed to be 20 blocks in the present embodiment), regardless of the number of message recordings or the number of receptions of the facsimile images or the number of pages thereof (assumed to be 32 blocks in the present embodiment).

The CPU 1 monitors the remaining capacity of the flash memory 13 from four factors, namely the number of recordable messages, the number of receivable facsimile images, the number of receivable pages of the facsimile images and the number of remaining blocks of the flash memory 13.

Figure 17:
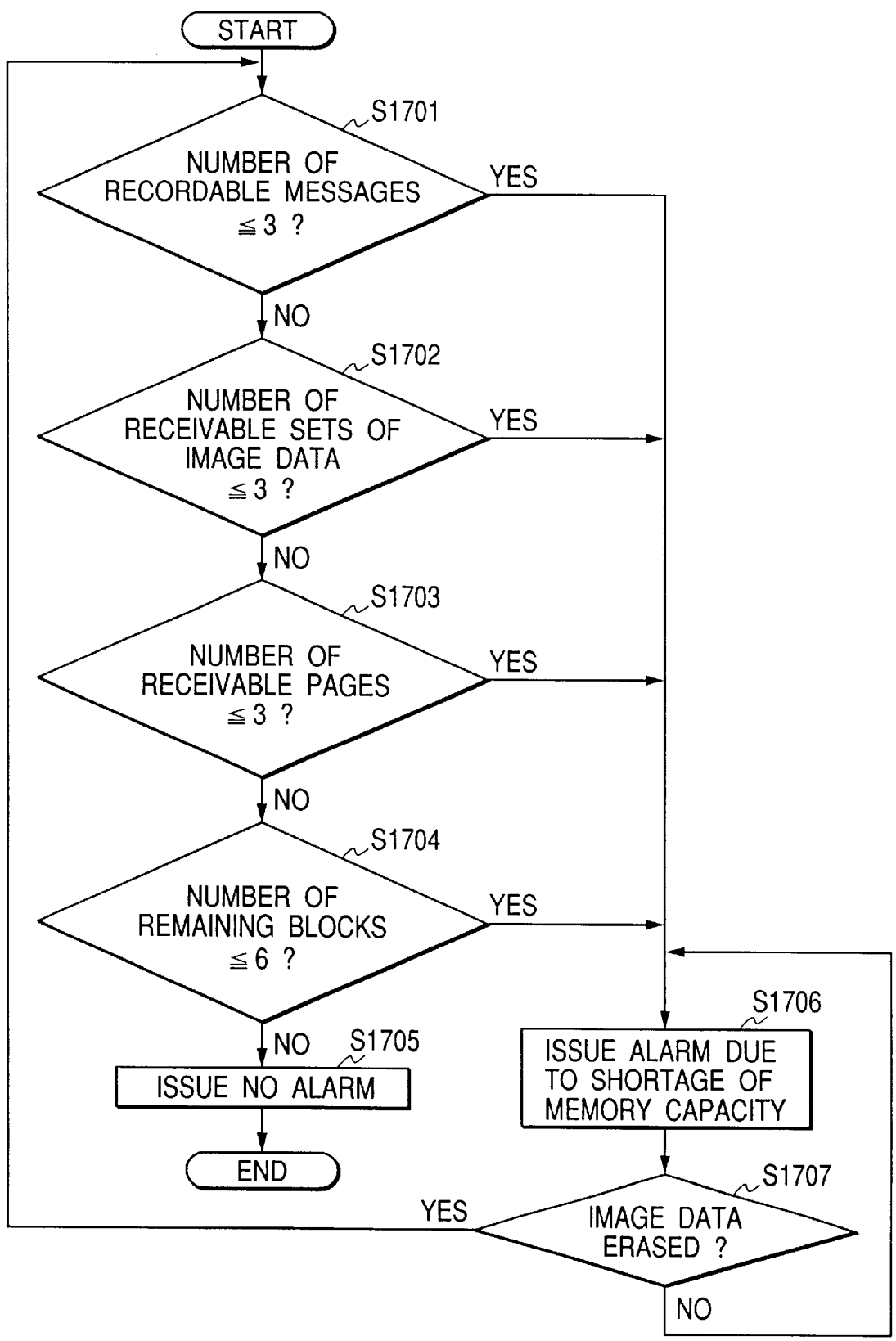
FIG. 17 is a flow chart showing an operation for monitoring the state of use of the flash memory in the above-mentioned image communication apparatus.

The CPU 1 discriminates, in succession, whether the number of recordable messages does not exceed 3 in a step S1701 in FIG. 17, then whether the number of receivable facsimile images does not exceed 3 in a step S1702, whether the number of receivable facsimile image pages does not exceed 3 in a step S1703, and whether the number of remaining blocks of the flash memory 13 does not exceed 6 in a step S1704. In case the number of recordable messages does not exceed 3, in case the number of receivable facsimile images does not exceed 3, in case the number of receivable facsimile image pages does not exceed 3, or in case the number of remaining blocks of the flash memory 13 does not exceed 6, a warning message indicating a small remaining capacity of the flash memory 13 is given to the user either through the display unit 18 or the speaker 6 (step S1706).

Then the CPU 1 discriminates whether the message or the facsimile image in the flash memory 13 has been erased (step S1707), and, if erased, the sequence returns to the foregoing step S1701. If the message or the facsimile image has not been erased, the sequence returns to the step S1706. On the other hand, if the aforementioned step S1704 identifies that the number of the remaining blocks of the flash memory 13 exceeds 6 blocks, the warning is not given to the user (step S1705) and the present sequence is terminated.

In the following there will be explained, with reference to FIG. 18, a warning process by releasing messages according to the state of use of the flash memory 13, in case the present apparatus is set at the message telephone mode.

Figure 18:
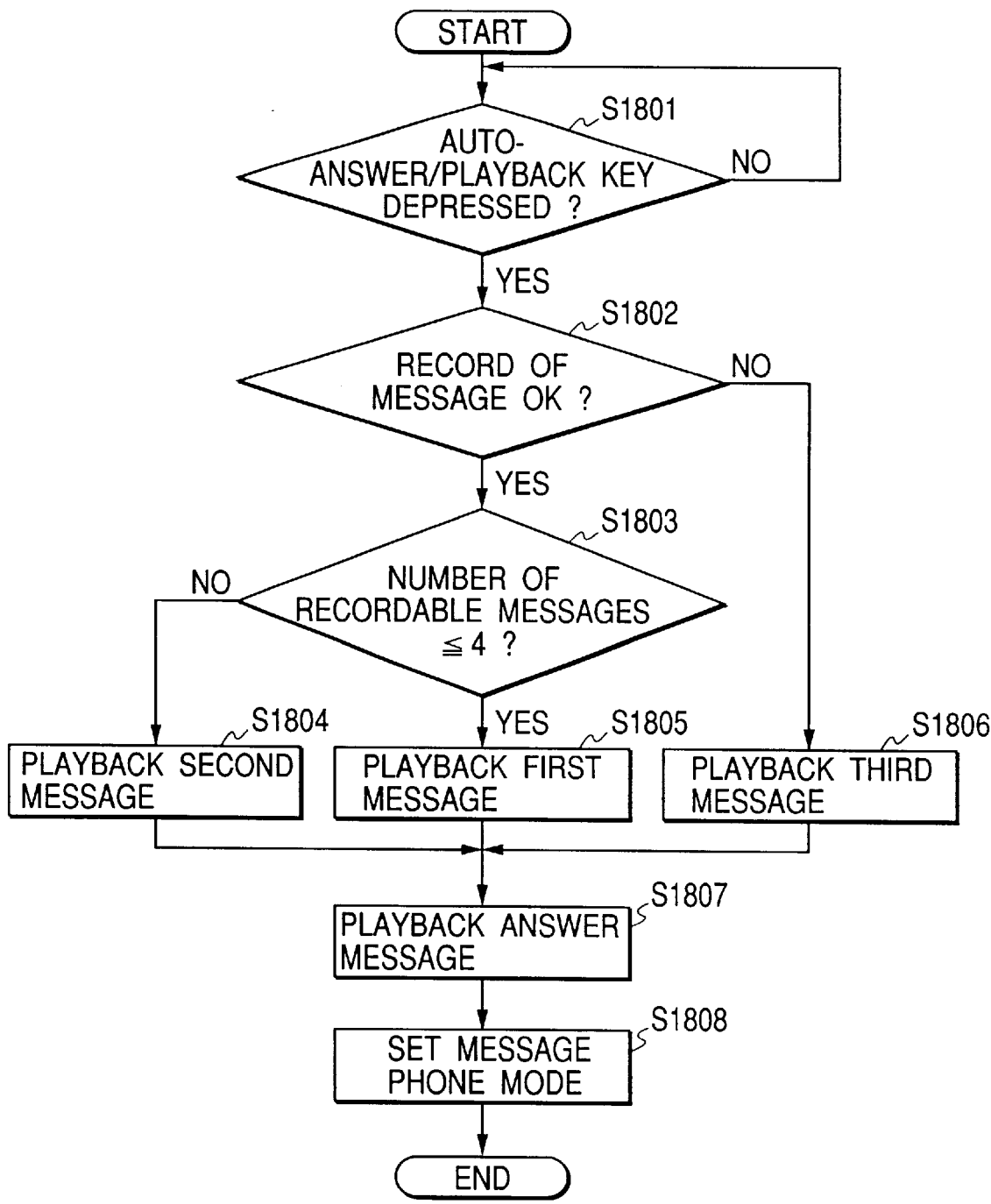
FIG. 18 is a flow chart showing an operation for setting a message phone mode in the above-mentioned image communication apparatus.

In a step S1801 in FIG. 18, the CPU 1 discriminates whether the message record/message setting key 17m is depressed for setting the present apparatus at the message telephone mode, and continues discrimination until such depression takes place. When the depression takes place, the CPU 1 discriminates whether the flash memory 13 is capable of recording the message (step S1802). If the flash memory 13 is capable of recording the message, the CPU 1 discriminates whether at least four messages can be recorded (step S1803). If at least four messages can be recorded, there is issued a first voice message, indicating that the message telephone mode has been set, to the user through the speaker 6 (step S1805).

In case the aforementioned step S1803 identifies that the number of recordable messages is less than 4, there is issued a second message to warn the user of a state that the capacity of the flash memory 13 soon becomes full and the unnecessary message or image should be erased (step S1804). Also in case the aforementioned step S1802 identifies that the message recording is not possible, there is issued a third warning message indicating that new message cannot be recorded and the unnecessary message or image should be erased.

After the issuance of the message to the user in the step S1804, S1805 or S1806, the response message which is transmitted to the partner of communication in the message telephone mode is reproduced from the speaker 6, then the message telephone mode is set (step S1808), whereupon the present sequence is terminated.

Second Embodiment

In the following there will be explained, with reference to FIG. 21, a computer-readable memory medium to be employed in the image communication method and apparatus of the present invention. By reading the program stored in the memory medium, the computer executes the same processes as those of the first embodiment. In such operation, a printer, a facsimile apparatus and a modem are connected to the computer. The modem may be incorporated in an expansion board. Also a color copying is possible by connecting a scanner. The printer is equipped with a color cartridge or a monochromatic cartridge interchangeably.

Figure 21:
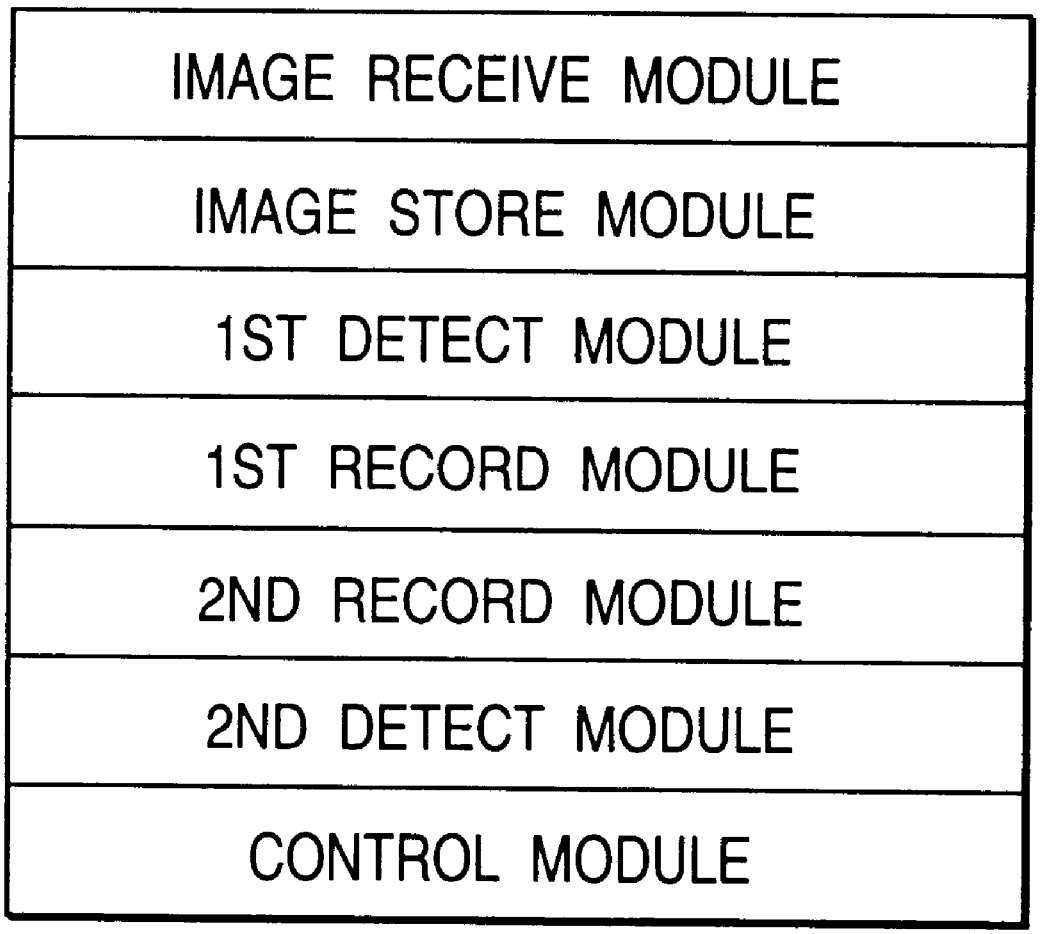
FIG. 21 is a view showing program modes of the modules stored in a memory medium for use in the image communication apparatus of the present invention.

The memory medium storing the program for controlling the image communication apparatus capable of color and monochromatic image recording stores certain program modules, including at least an "image reception module", an "image storage module", a "first detection module", a first recording module", a "second recording module", a "second detection module" and a "control module" as shown in FIG. 21.

The "image reception module" is used for receiving the image. The "image storage module" is used for storing the image. The "first detection module" is used for detecting which of the auto reception mode and the direct reception mode is set. The "first recording module" is used for monochromatic recording of the image with the color recording means. The "second recording module" is used for monochromatic recording of the image with the monochromatic recording means. The "second detection module" is used for detecting the presence/absence and the kind of the recording module supported on the support means. The "control module" is used for effecting the image receiving process according to the results of detection by the first detection module and the second detection module.

As explained in the foregoing, the first and second embodiments of the present invention allow to effect the memory reception in case the auto reception mode is selected, and to inform the partner of communication with a communication speed variably according to the kind of the recording means in case the direction reception mode is selected. More specifically, a high communication speed can be informed to the partner in case of employing recording means peculiar to monochromatic recording which can achieve faster recording than the recording means capable of color recording and but lessens the recording speed, whereby the image reception process can be achieved in securer manner and the error in reception can be avoided.

Also the memory medium of the second embodiment of the present invention allows to smoothly control the image communication apparatus of the present invention.

Furthermore, the first and second embodiments of the present invention allow to execute the memory reception in case the recording sheet is absent and to inform the partner of communication with a variable communication speed according to the kind of the recording means in case the recording sheet is present. More specifically, a faster communication speed can be informed to the partner in case of employing recording means peculiar to monochromatic recording which can achieve faster recording than the recording means capable of color recording but lessens in the recording speed, whereby the image reception process can be achieved in securer manner and the error in reception can be avoided.

What is claimed is:

1. A communication apparatus comprising:

reception means for receiving data from a partner;

informing means for informing the partner of a maximum reception speed of said apparatus;

recording means for recording, on a recording sheet, image data received by said reception means;

detection means for detecting a maximum recording ability of said recording means; and control means for causing said informing means to vary the maximum reception speed to be informed to the partner, according to the maximum recording ability detected by said detection means, wherein said recording means is a printer of an ink jet recording method and is capable of recording a color image and a monochromatic image by the interchange of a cartridge, said detection means is adapted to detect whether a color cartridge for recording the color image or a monochromatic cartridge for recording the monochromatic image is mounted, and said control means is adapted to cause said informing means to vary the maximum reception speed to be informed to the partner according to whether the color cartridge or the monochromatic cartridge is mounted, wherein said control means is adapted, in case of the color cartridge being mounted on said recording means, to cause said informing means to inform the partner of a lower maximum reception speed in comparison with a case where the monochromatic cartridge is mounted on said recording means, and wherein a number of black-nozzles of the monochromatic cartridge is greater than a number of black-nozzles of the color cartridge, and said recording means records a received image using black ink.

2. A communication apparatus according to claim 1, wherein said recording means is capable of color recording and monochromatic recording, said detection means is adapted to detect whether the setting is for recording a color image or recording a monochromatic image, and said control means is adapted to cause said informing means to very the maximum reception speed to be informed to the partner according to the setting of said recording whether to record the color image or to record the monochromatic image.

3. A communication apparatus according to claim 2, wherein said control means is adapted, in case of the setting for recording the color image, to cause said informing means to inform the partner of a lower maximum reception speed in comparison with a case of the setting for recording the monochromatic image.

4. A communication apparatus according to claim 1, further comprising:

storage means for storing data received by said reception means; and switch means for selecting, by an operation of an operator, a memory reception mode for storing the image data received by said reception means in said storage means, or a direct reception mode in which the image data received by said reception means are recorded by said recording means without being stored in said storage means, wherein said control means is adapted, in case the direct reception mode is selected by said switch means, to cause said informing means to vary the maximum reception speed to be informed to the partner apparatus according to the result of detection by said detection means, and, in case the memory reception mode is selected by said switch means, to cause said informing means to inform a predetermined maximum reception speed.

5. A communication apparatus according to claim 1, wherein said data are image data.

6. A communication apparatus according to claim 5, wherein said communication apparatus is a facsimile apparatus.

* * * * *

UNITED STATES PATENT AND TRADEMARK OFFICE
CERTIFICATE OF CORRECTION

PATENT NO.   : 6,252,672 B1                                Page 1 of 1
DATED        : June 26, 2001
INVENTOR(S)  : Naoki Sugawara et al.

Figure 15B:
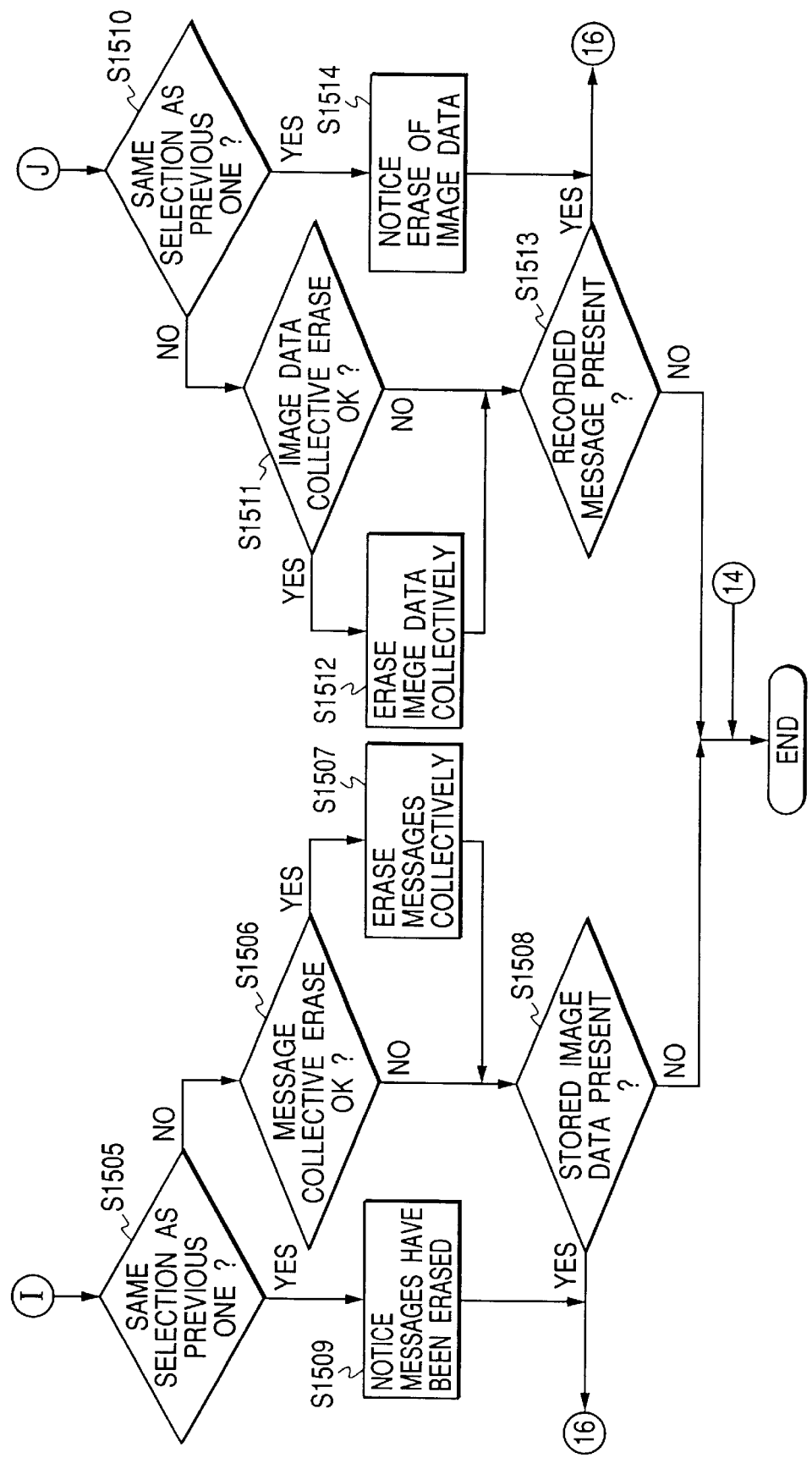

It is certified that error appears in the above-identified patent and that said Letters Patent is hereby corrected as shown below:

Drawings,
Sheet 18 of 24, FIG. 15B, "IMEGE" should read -- IMAGE --.

Column 4,
Line 16, "an" should read -- a --.

Column 6,
Line 11, "please or" should read -- or please --.

Column 9,
Line 21, "recoreded" should read -- recorded --.

Column 11,
Line 42, "is-given" should read -- is given --.

Column 19,
Line 29, "very" should read -- vary --.

Signed and Sealed this

Twenty-sixth Day of March, 2002

Attest:

JAMES E. ROGAN
*Attesting Officer*     *Director of the United States Patent and Trademark Office*